Fig. 15.

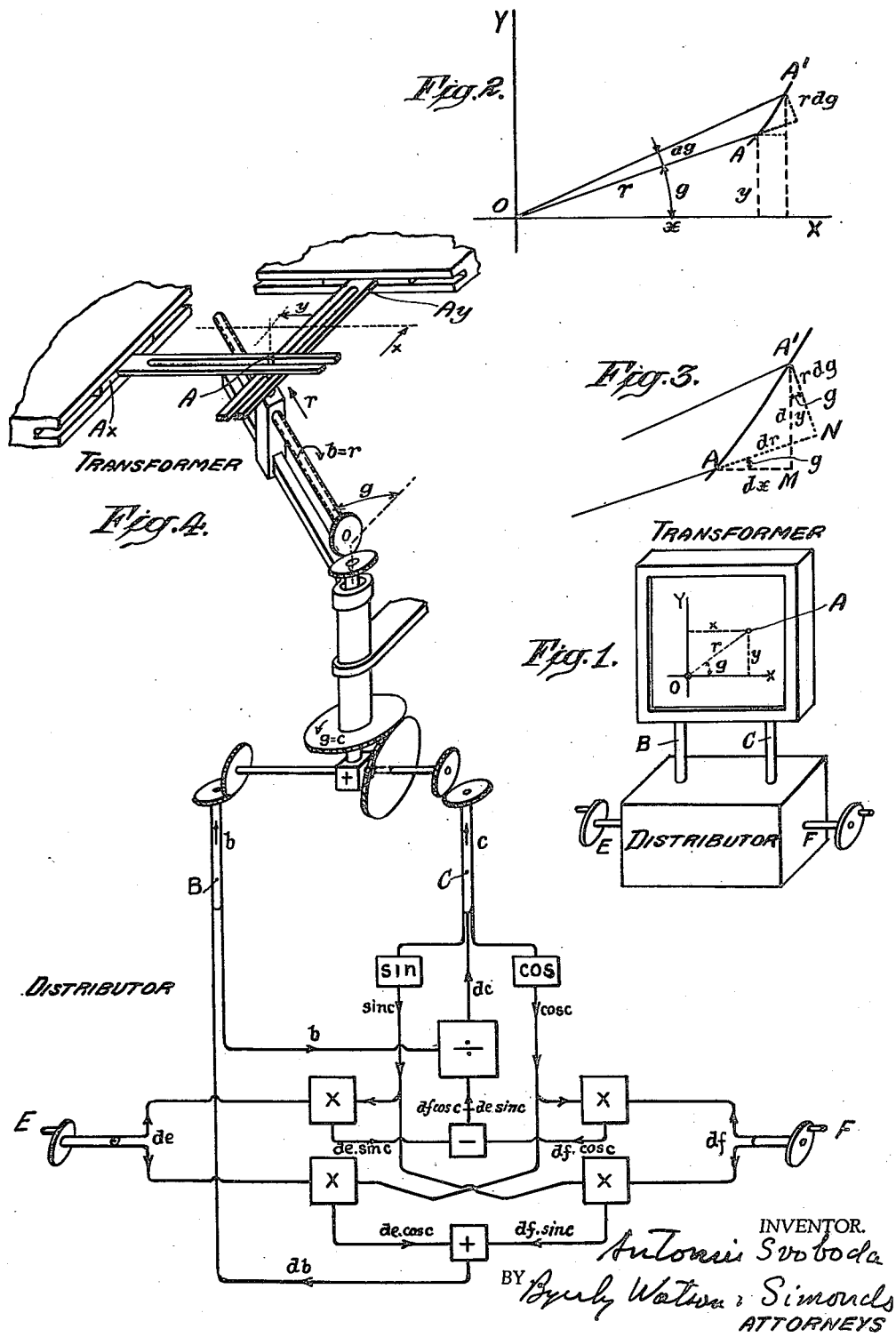

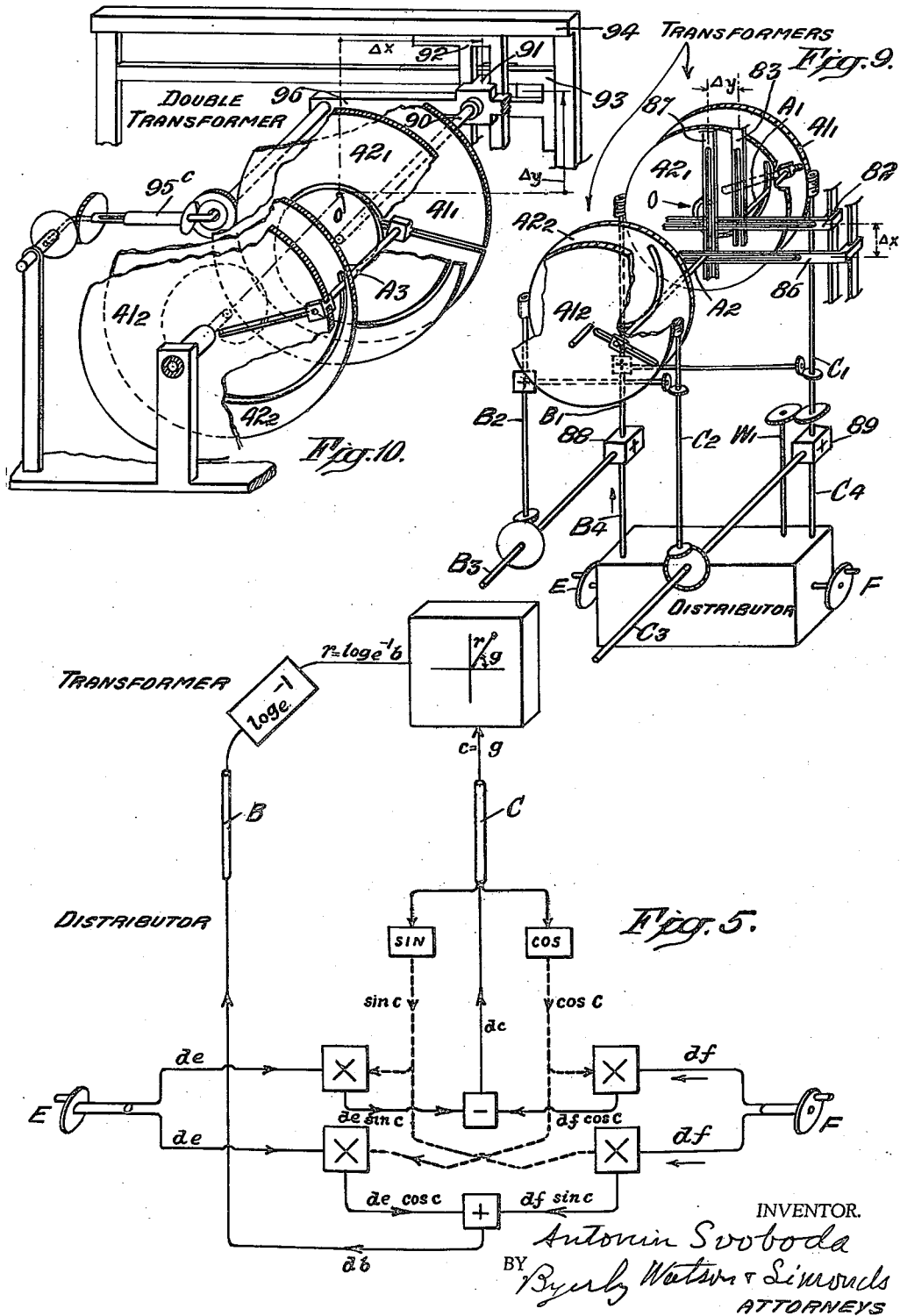

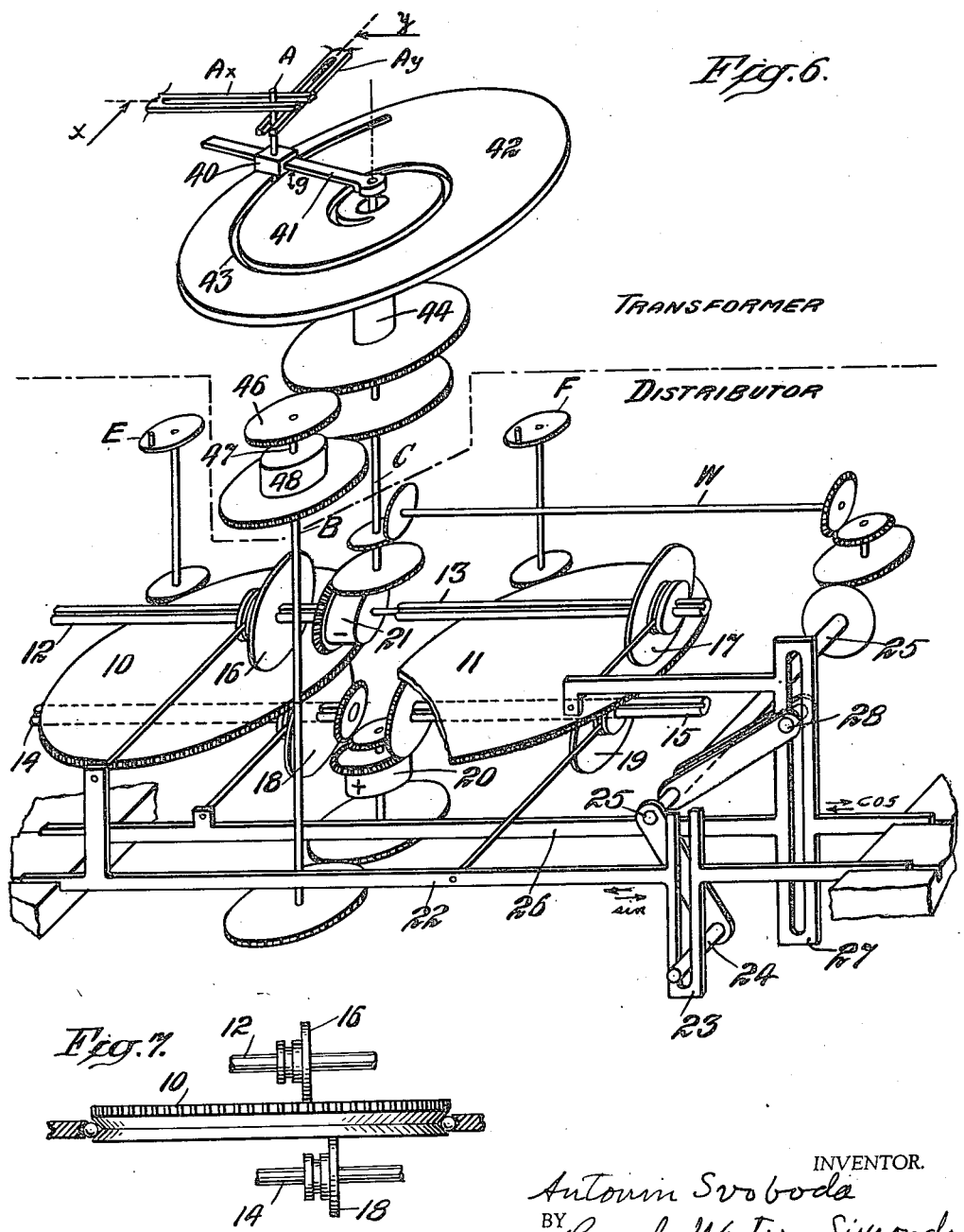

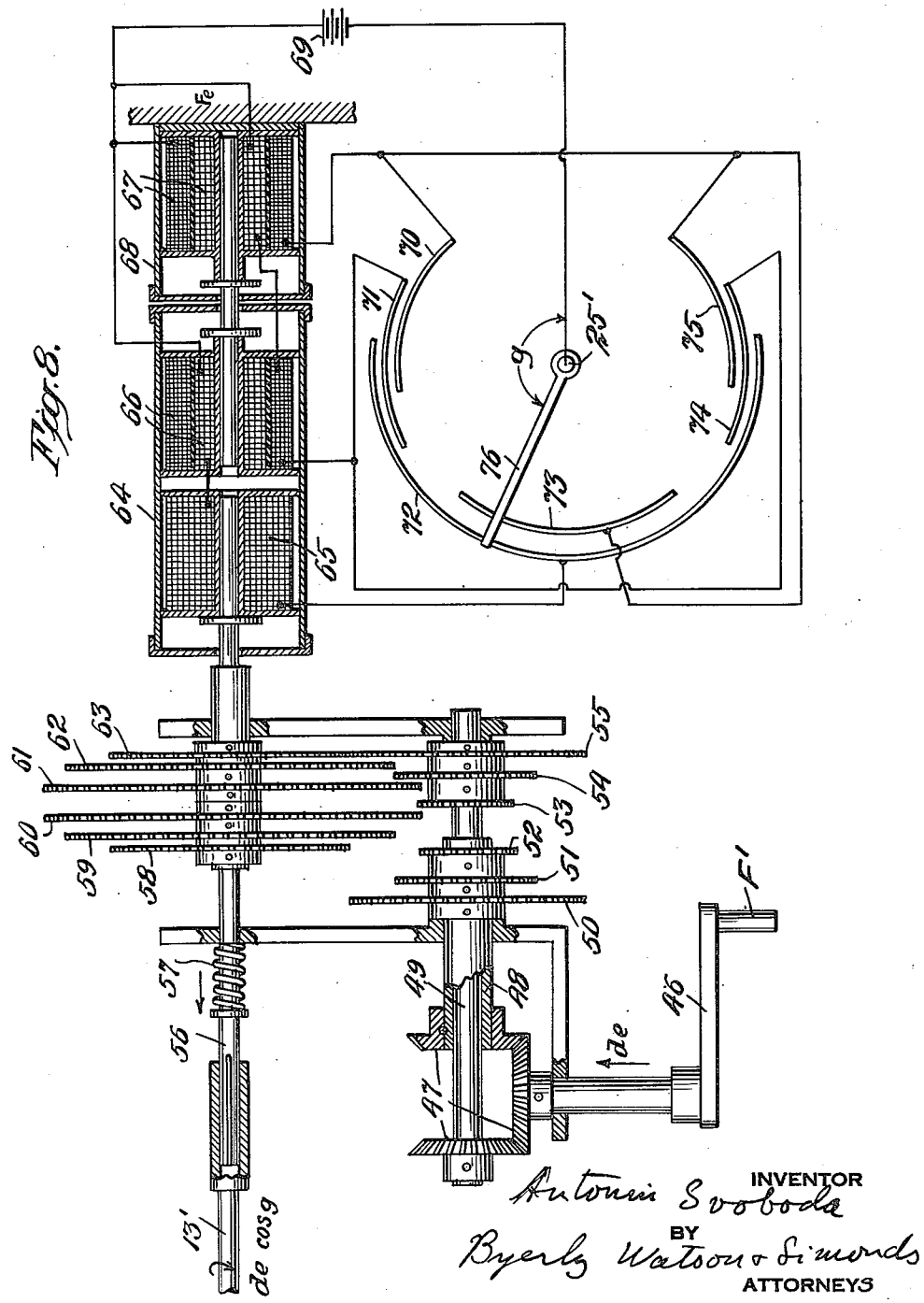

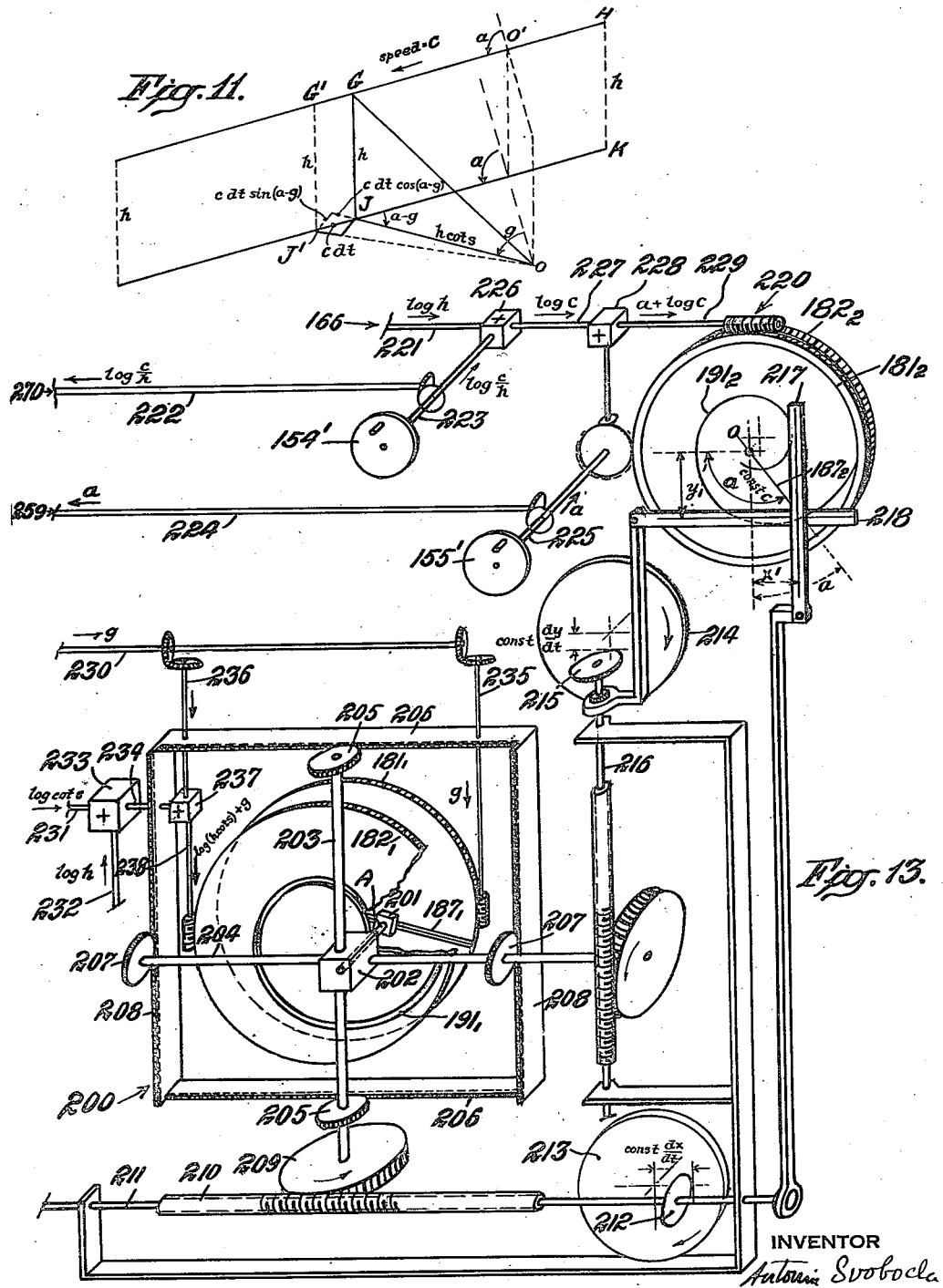

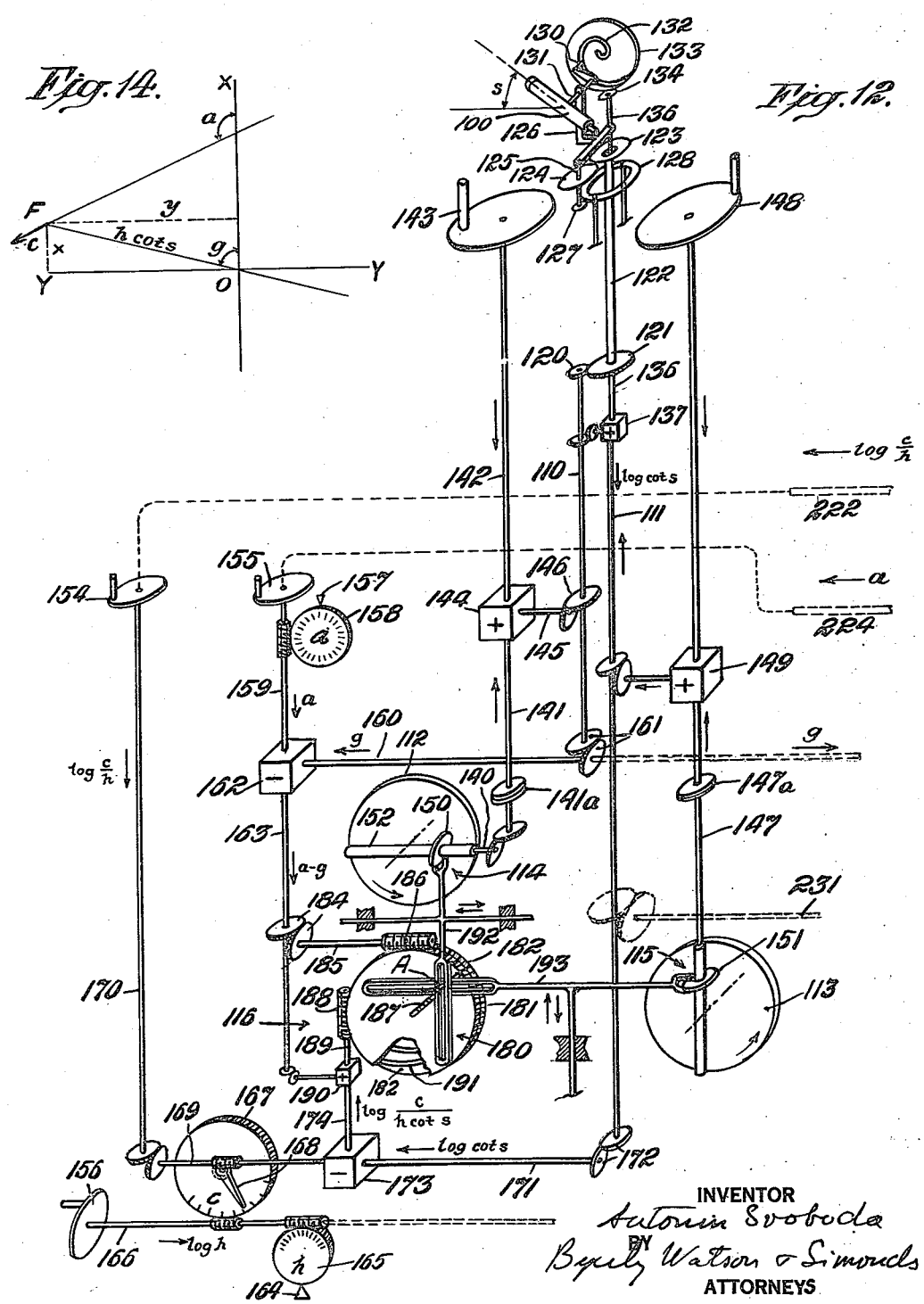

Oct. 2, 1945.    A. SVOBODA    2,385,952
FIRE DIRECTOR APPARATUS FOR ANTIAIRCRAFT GUNS
Filed May 23, 1941    11 Sheets-Sheet 8

INVENTOR
Antonin Svoboda
BY
ATTORNEY

Oct. 2, 1945.  A. SVOBODA  2,385,952
FIRE DIRECTOR APPARATUS FOR ANTIAIRCRAFT GUNS
Filed May 23, 1941  11 Sheets-Sheet 9

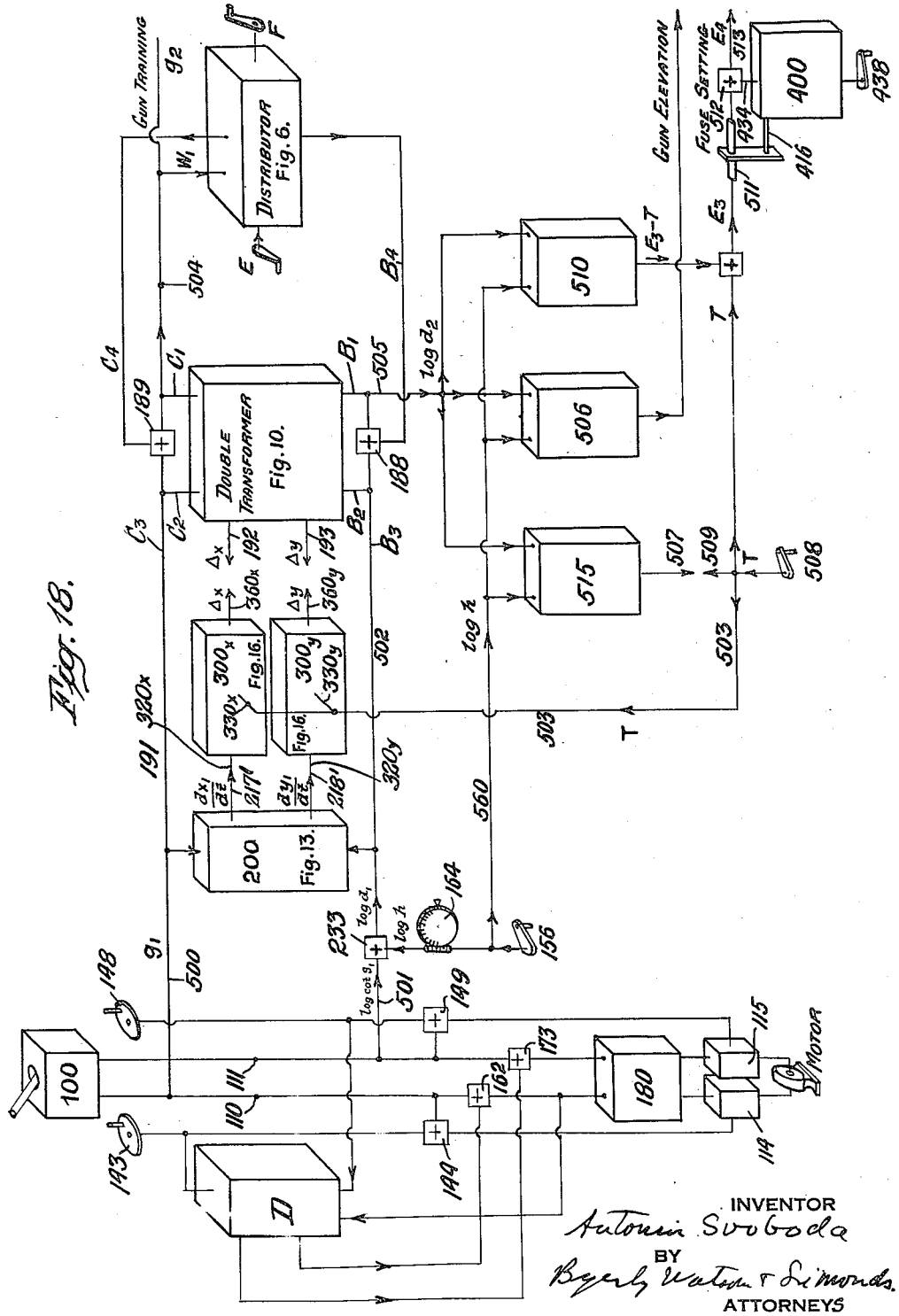

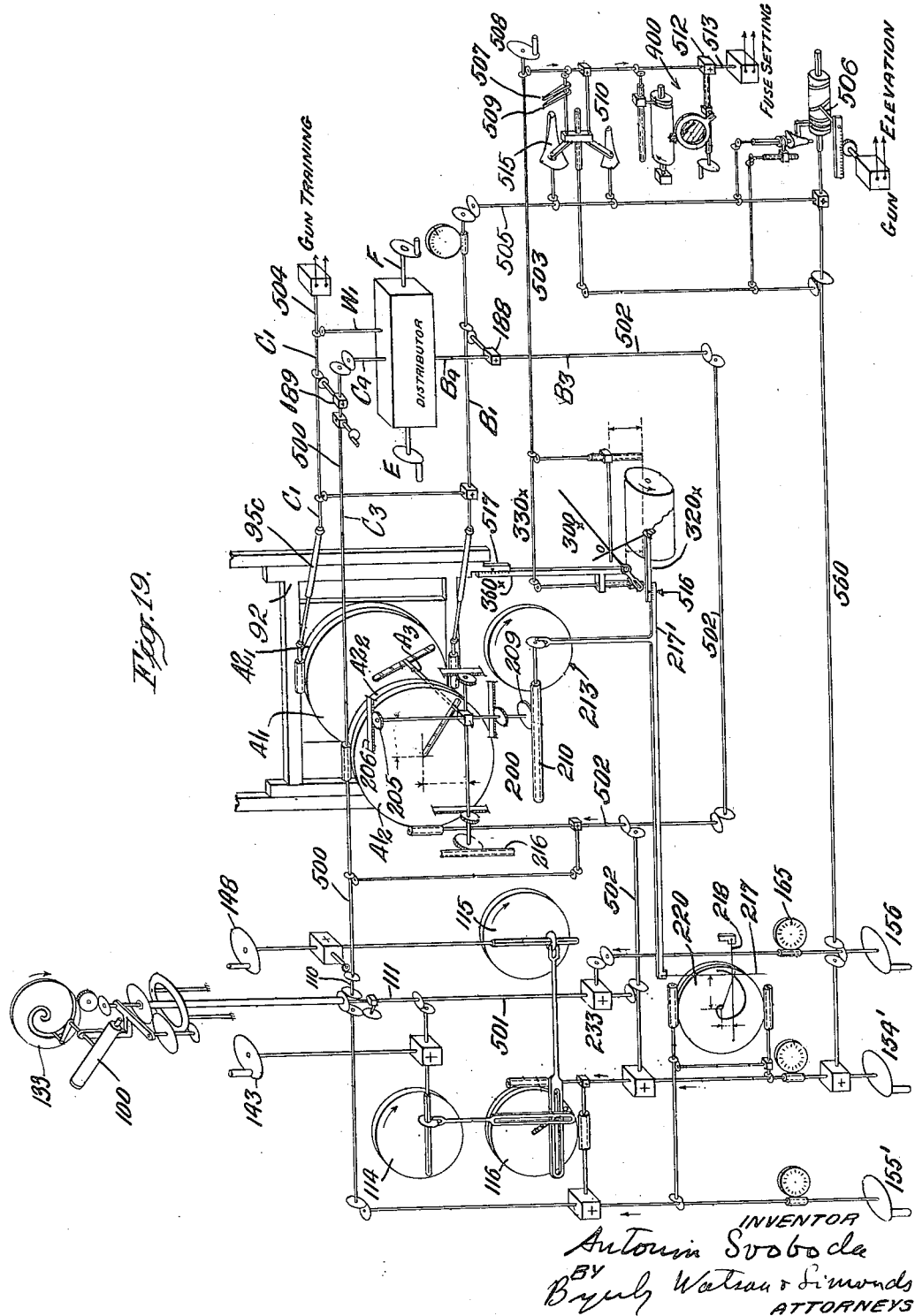

Patented Oct. 2, 1945

2,385,952

UNITED STATES PATENT OFFICE 2,385,952

FIRE DIRECTOR APPARATUS FOR ANTIAIRCRAFT GUNS

Antonin Svoboda, Forest Hills, N. Y.

Application May 23, 1941, Serial No. 394,954
In France May 23, 1940

19 Claims. (Cl. 235—61.5)

This invention relates to a fire director apparatus for anti-aircraft guns.

The fire director apparatus which I have invented combines the use of polar and rectangular coordinates in such a way that, while the calculations and the indications to the operators of the apparatus are in rectangular coordinates, the connections between various parts of the apparatus move in accordance with corresponding polar coordinates. The apparatus thus combines the facility which is obtained by using rectangular coordinates for calculations and observations with the mechanical advantages and accuracy obtained by the use of rotary shafts.

The new fire director apparatus incorporates a number of new mechanisms which are necessary to its successful operation and which are also useful in other connections. These new mechanisms include:

(1) An apparatus for obtaining rotary movements which are functions of polar coordinates of a moving point whose rectangular coordinates are known, and also for obtaining rotary movements proportional to the differences between functions of the polar coordinates of two moving points when the differences between the rectangular coordinates of the moving points are given.

(2) Training and elevating mechanism for automatically varying the training and elevation angles of an instrument to keep the axis of the instrument directed at a point moving on a fixed course at a constant height at a constant speed.

(3) A computing device or predictor for indicating the value which a function of time will have after a variable time interval, and (4) A computing device or predictor for indicating a close approximation to the value which a function of time will have after a fixed predetermined time interval.

As each of the four mechanisms is, so far as I am aware, entirely new in principle and in operation, it will be necessary to describe each of these mechanisms in order that the operation of the fire director apparatus in which they are included may be understood.

The drawings accompanying this specification are as follows:

(1) *Apparatus for obtaining rotary movements which are functions of polar coordinates of a moving point whose rectangular coordinates are known*

Fig. 1 is a simplified perspective view showing the essential moving parts of the apparatus;

Figs. 2 and 3 are diagrams showing the derivation of the equations on which the apparatus is based;

Fig. 4 is a diagrammatic view of one form of the apparatus showing the distributor part schematically;

Fig. 5 is a schematic view of a simplified form of the apparatus;

Fig. 6 is a diagrammatic perspective view of the apparatus shown schematically in Fig. 5;

Fig. 7 is the details showing the mounting of the disc 10 in Fig. 6;

Fig. 8 is a diagrammatic view of a change-speed transmission which may be substituted for the variable-speed transmissions shown in Fig. 6;

Fig. 9 is a diagrammatic view of a modified form of the apparatus for obtaining rotary movements proportional to the difference between functions of two sets of polar coordinates;

Fig. 10 is a diagrammatic perspective view of a transformer which may be substituted for the transformer part of the apparatus shown in Fig. 9.

(2) *Training and elevating apparatus*

Figs. 11 and 14 are diagrams for use in explaining the principle of the apparatus;

Fig. 12 is a diagrammatic perspective view of automatic training and elevating apparatus in which the constants of the target's movement are introduced manually;

Fig. 13 shows an indicating apparatus which may be used with the apparatus of Fig. 12 to insure accuracy in the manual introduction of the constants of the target's movement;

Figure 15:
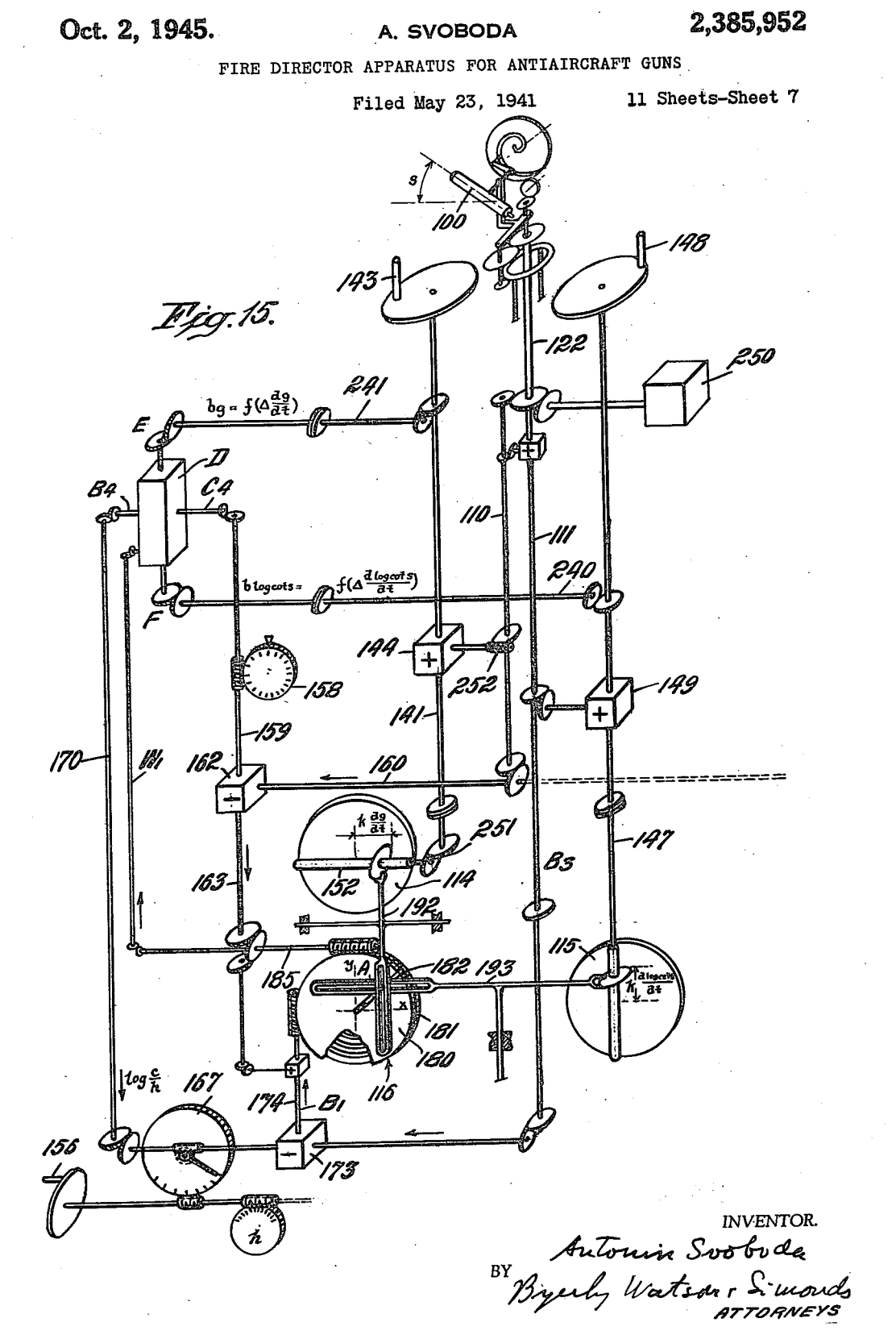

Fig. 15 is a modified training and elevating apparatus in which the constants of the target's movement are introduced automatically by merely pointing the telescope at the target for a few moments.

(3), (4) *Predictors*

Figure 16:
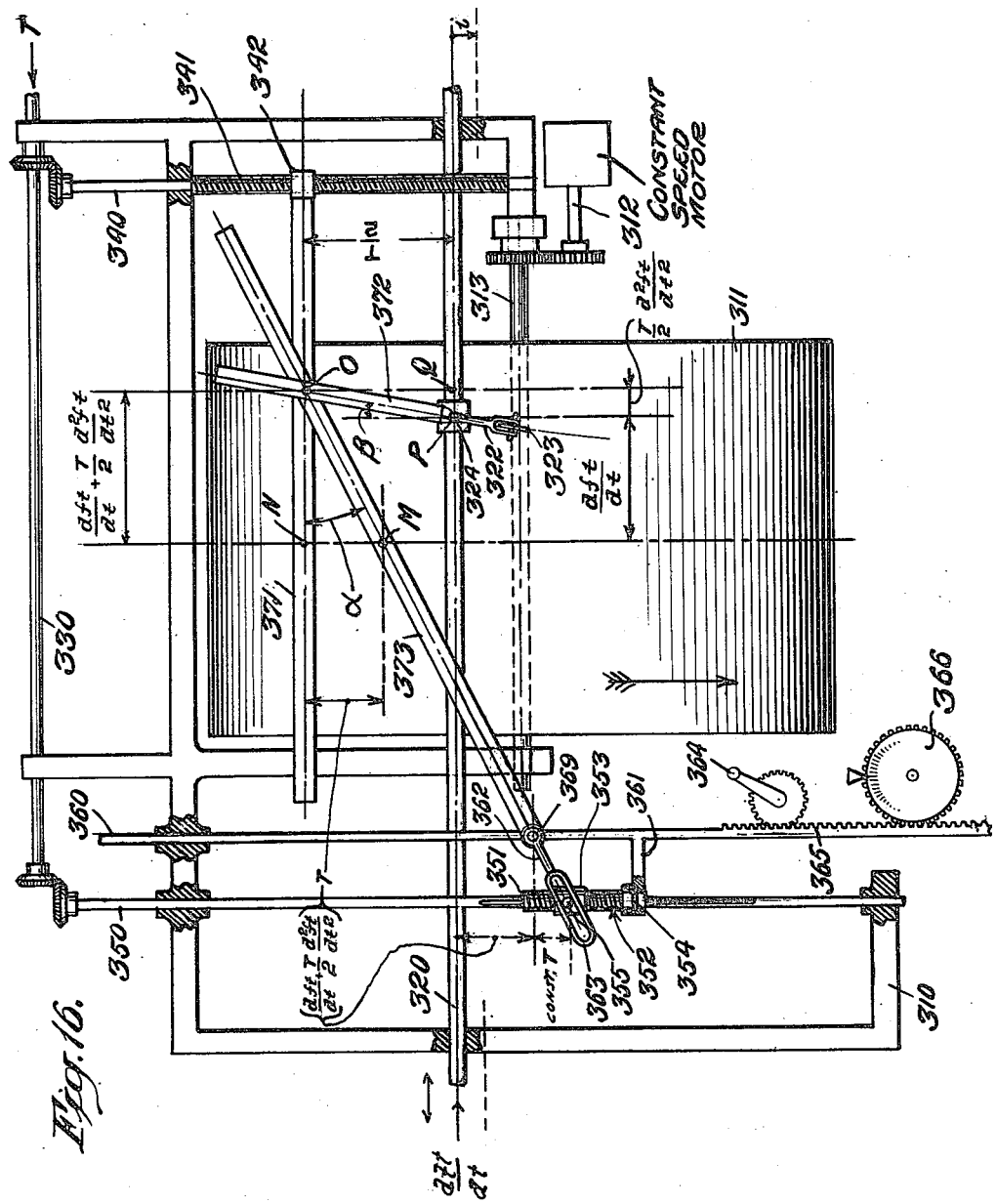
Figure 17:
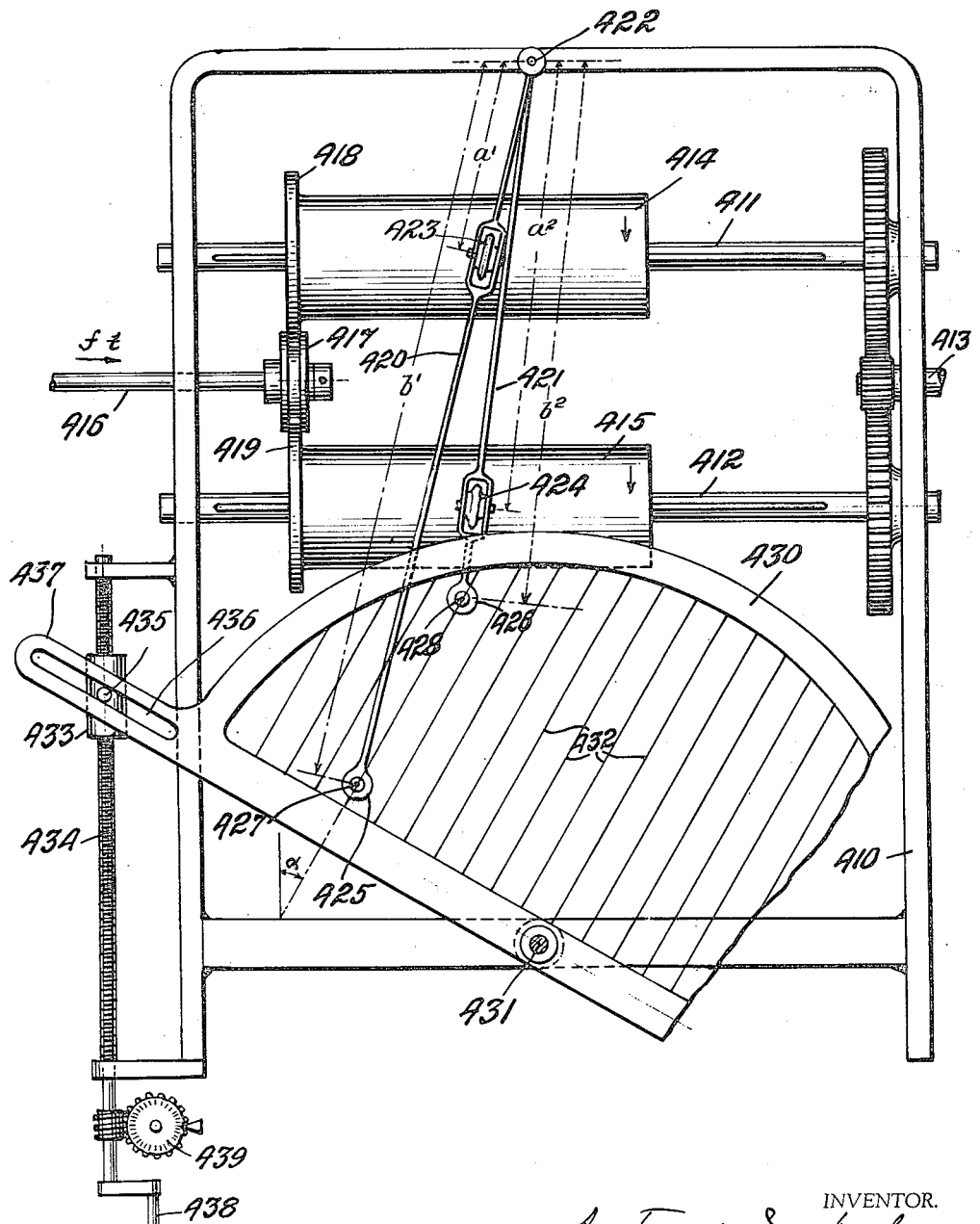

Fig. 16 is a diagrammatic plan view of a computing device for indicating the value which a function of time will have after a variable predetermined time interval;

Fig. 17 is a diagrammatic plan view of a predictor for indicating a close approximation to the value which a function of time will have after a fixed predetermined time interval.

(5) *Fire director apparatus*

Fig. 18 is a schematic diagram of a complete fire director apparatus; and

Fig. 19 is a diagrammatic perspective view of the complete fire director apparatus.

I will now describe and explain the operation of the four new mechanisms used in my fire director apparatus in order to make possible a simple explanation of the operation of a complete fire director apparatus incorporating these mechanisms:

(1) Apparatus for obtaining rotary movements which are functions of the polar coordinates of a moving point whose rectangular coordinates are known It is mechanically feasible to transform movements corresponding to changes in the polar coordinates of a moving point into movements corresponding to changes in the rectangular coordinates of the point, but the reverse of this is not true. The bearing angle of a point located near the origin of a system of polar coordinates changes so rapidly with slight changes in the rectangular coordinates of the point that it is impracticable to provide an accurate mechanism in which elements moved in correspondence to changes in the rectangular coordinates effect movements corresponding to changes in corresponding polar coordinates.

To overcome this difficulty, I supplement a "transformer" mechanism for transforming polar coordinate movement of a pair of shafts into rectangular coordinate movements of an observable element with a device, which I term a "distributor," in which two manually operated actuators are so interconnected with polar coordinate shafts that the turning of one of them moves the observable element so as to change only one rectangular coordinate, while the turning of the other actuator changes only the other rectangular coordinate. With this device, it is a simple matter to obtain rotary movements which are functions of the polar coordinates of a moving point when the value of rectangular coordinates of the point are given. All that is necessary is to turn one actuator so as to make the required changes in the value of one rectangular coordinate of the observable element, and to turn the other actuator independently to make the required changes in the value of the other rectangular coordinate of that element. The interconnections between the two actuators and the two shafts of the distributor are based on a mathematical relation between changes in the polar coordinates of a moving point and the corresponding changes in the rectangular coordinates of the point.

To adapt the apparatus for producing rotary movements proportional to the differences between the polar coordinates of two moving points, it is necessary only to make a slight modification in the distributor and to combine it with two transformers.

I will first explain the principle of my apparatus. As shown in Fig. 1, the apparatus consists essentially of the following moving parts: an element A movable in any direction in a plane XY, turnable shafts B and C, and turnable actuators E and F. The plane in which the element A is movable contains two fixed perpendicular axes of reference OX and OY, and mechanical or visual means for measuring its distance from each of these axes and thus indicating the values of the rectangular coordinates of the position of the element A in its plane at any time. The actuators E and F may consist of cranks which may be turned manually. They are connected to the shafts B and C to turn the shafts, and the shafts are connected to the element A to displace the element A in its plane.

The element A and the connections between the shafts B and C and the element A constitute the part of the apparatus which I term the transformer. These connections are such that turning movements of the shaft B change the distance between the element A and the point 0 without changing its bearing from the point 0, while turning movements of the shaft C change the bearing of the element A from the point 0 without changing its distance from the point 0.

The actuators E and F, and the connections between them and the shafts B and C constitute the part of the apparatus which I term the distributor. These connections are such that turning movements of the actuator E turn the shafts B and C in such manner as to move the element A parallel to the axis OX, while turning movements of the actuator F turn the shafts B and C in such manner as to move the element A parallel to the axis OY.

To explain the nature of the connecting mechanism, it may be assumed that at some instant of time, the positions of the movable parts A, B, C, E and F are as follows:

The element A is at a distance $y$ from the axis OX and at a distance $x$ from the axis OY and at a distance $r$ from the point 0, and the bearing angle of A from O measured from the axis OX is $g$.

The shaft B has turned through an angle $b$ and the shaft C has turned through an angle $c$.

The actuator handle E has turned through an angle $e$ and the handle of the actuator F has turned through an angle $f$.

In a time interval $dt$, the actuator E is turned through an arc $de$, and the actuator F is independently turned through an arc $df$, and this results in turning the shaft B through an arc $db$, and the shaft C through an arc $dc$, moving the element A so as to change its polar coordinates by increments $dr$ and $dg$ and its rectangular coordinates by increments $dx$ and $dy$.

The connections between the parts are such that $r$ is a function of $b$ and is independent of $c$, while $g$ is a function of $c$ and is independent of $b$, while at the same time $x$ changes with $e$ and is independent of $f$, and $y$ changes with $f$ and is independent of $e$.

The relations between $dr$, $dg$, $dx$ and $dy$ may be determined geometrically from the diagrams Figs. 2 and 3 as follows:

Fig. 2 shows the rectangular coordinates $x$, $y$ and the polar coordinates $r$, $g$ of a point A and indicates the change in each one of the four coordinates caused by movement of the point A to $A_1$, which may be regarded as an infinitesimal movement. Fig. 3 is an enlargement of part of Fig. 2. Fig. 3 shows two infinitesimal right triangles AMA' and ANA'. The lengths of the sides of these triangles are indicated in Fig. 3. The side A'N represents an arc of radius $r$ swung through the infinitesimal angle $dg$ and is, therefore, $r\,dg$. The lengths of the other sides are the infinitesimal increments of the coordinates $r$, $x$ and $y$.

Since the broken line AMA'NA forms a closed figure, the length of an orthogonal projection of this line on any straight line must be zero. By projecting the parts of this broken line on the straight line ON, we obtain $AM \cos g + MA' \sin g + A'N \cos 90° - NA \cos 0° = 0$ Inserting the values of the lengths of the parts of the broken line, $dx \cos g + dy \sin g + 0 - dr = 0$ Transposing, we obtain—

$$dr = dx \cos g + dy \sin g \qquad (1)$$

Projecting the parts of the broken line AMA'ANA on the straight line NA', we obtain $$MA' \cos g - AM \sin g - A'N \cos 0° + NA \cos 90° = 0$$

Substituting the values of the lengths of the parts of the broken line, $$dy \cos g - dx \sin g - rdg + 0 = 0$$

Transposing and dividing by $r$, we obtain $$dg = -dx \frac{\sin g}{r} + dy \frac{\cos g}{r} \quad (2)$$

Solving Equations 1 and 2 for $dx$ and $dy$, we obtain $$dx = dr \cos g - rdg \sin g \quad (3)$$

and $$dy = dr \sin g + rdg \cos g \quad (4)$$

Now, if the connections between the shafts B and C and the element A are made such that radial movements of the element A are proportional or (to simplify) equal to turning movements of the shaft B while angular movements of the element A are equal to turning movements of the shaft C or, in other words so that $$b = r$$

and $$c = g$$

$b$ and $c$, may be substituted for $r$ and $g$ in Equations 1 and 2:

$$db = dx \cos c + dy \sin c \quad (5)$$

$$dc = -\frac{dx \sin c}{b} + \frac{dy \cos c}{b} \quad (6)$$

Equations 5 and 6 will then give the relation between turning movements of the shafts B and C and the changes thereby caused in the rectangular coordinates $x$, $y$ of the element A. Now if the mechanical connections between the actuators E, F, and the shafts B, C, are such that turning movements of the shafts B and C are related to the turning movements of the actuators E and F by the following equations:

$$db = de \cos c + df \sin c \quad (7)$$

$$dc = -\frac{de \sin c}{b} + \frac{df \cos c}{b} \quad (8)$$

it is evident from comparison of Equations 5 and 6 with Equations 7 and 8 that:

$$dx = de$$

and $$dy = df$$

so that with such mechanical connections turning movements of the actuator E will move the element A through the shafts B and C so as to change the $x-$ coordinate of the element A by an amount equal to turning movement of the actuator E, while at the same time the turning movements of the actuator F will be reproduced as changes in the $y-$ coordinate of the element A.

The apparatus which has been described is illustrated diagrammatically in Fig. 4. The distributor part of the apparatus is shown schematically by arrows which represent mechanical connections, such as shafts, for transferring mechanical movements, and boxes which represent devices for combining the mechanical movements which are brought to them by multiplication, division, addition or subtraction as indicated by the symbol on each box. Thus, the boxes marked "$x$" and "$\div$" may contain variable-speed transmissions, while the boxes marked "$+$" and "$-$" may contain differentials. The boxes marked "sin," "cos" represent mechanical devices for translating a movement proportional to the angle into a movement proportional to the indicated trigonometric functions of the angle. In the distributor, the connections between the cranks E and F and the shafts B and C operate in accordance with Equations 7 and 8, and in the transformer the changes in the polar coordinates of the element A are equal or proportional to the turning movements of the shafts B and C respectively, so that turning the actuators E moves the slide $A_x$ measuring the $x$ coordinate of the element A without moving the slide $A_y$ and measuring the $y$ ordinate of the element A, while turning the crank F moves the slide $A_y$ without moving the slide $A_x$.

My invention is by no means limited to the use of connections such as are indicated in Fig. 4, for it is not essential that the changes in the rectangular coordinates of element A be equal to the turning movements of the actuators E and F, but merely that the change in the $x$ coordinate be caused only by the turning movement of the actuator E and the change in the $y$ coordinate be caused only by the turning movement of the actator F. Furthermore, it is not essential that the turning movements of the shafts B and C be equal to the changes in the polar coordinates $r$ and $g$ but merely that the change in the coordinate $r$ be a function of the turning movement of the shaft B and the change in the coordinate $g$ be an independent function of the turning movement of the shaft C. The connections between the elements of my apparatus, therefore, need not be those specifically indicated in Fig. 4. The required connections are as follows:

Connection B—A must be such that $$b = f(r) \text{ i. e. } db = df(r) \quad (9)$$

Connection C—A must be such that $$c = F(g) \text{ i. e. } dc = dF(g) \quad (10)$$

Since, as appears from Fig. 2, $$x = r \cos g \quad (11)$$

and $$y = r \sin g \quad (12)$$

the connections between E and F and B and C must produce movements corresponding to the following equations:

$$db = \phi_1 (b, c) \, de + \psi_1 (b, c) \, df \quad (13)$$

$$dc = \psi_2 (b, c) \, de + \phi_2 (b, c) \, df \quad (14)$$

in such a way that the differentials $dx$, $dy$ (which are not total) have the forms $$dx = \chi (g, r) . de \quad (15)$$

$$dy = \xi (g, r) . df \quad (16)$$

While any such connections may be used within the scope of my invention, an important specific feature of my invention consists in selecting functions which lead to simple and accurate mechanical connections. In accordance with this feature of my invention, I select the functions indicated in the above equations as follows:

$$b = f(r) \equiv \log_e r, \left( \text{so that } db = \frac{dr}{r} \right) \quad (9a)$$

$$c = F(g) \equiv g \text{ (so that } dc = dg) \quad (10a)$$

$$\phi_1 (b, c) \equiv \cos c = \cos g; \; \psi_1 (b, c) \equiv \sin c = \sin g$$

$$\phi_2 (b, c) \equiv \cos c = \cos g; \; \psi_2 (b, c) \equiv -\sin c = -\sin g$$

Equations 13 and 14 then become $$db = \cos g \cdot de + \sin g \cdot df \quad (13a)$$
$$dc = -\sin g \cdot de + \cos g \cdot df \quad (14a)$$

To check the functions selected, it is necessary to ascertain whether they result in giving $dx$ and $dy$ the forms required by Equations 15 and 16. To do this, Equations 3 and 4 giving the values of $dx$ and $dy$ are combined with Equations 9a and 10a to eliminate $dr$ and $dg$, giving $$dx = r \cdot db \cdot \cos g - r \cdot dc \cdot \sin g \quad (17)$$
$$dy = r \cdot db \sin g + r \cdot dc \cdot \cos g \quad (18)$$

Substituting in Equation 17 the values of $db$ and $dc$ given by Equations 13a and 14a, we obtain $$dx = r \cdot (\cos g \cdot de + \sin g \cdot df) \cdot \cos g - r \cdot (-\sin g \cdot de + \cos g \cdot df) \cdot \sin g \quad (19)$$

which simplifies to $$dx = r \cdot de \quad (20)$$

In the same way the substitution in Equation 18 of the values of $db$ and $dc$ given by Equations 13a and 14a gives $$dy = r \cdot df \quad (21)$$

Since the values of $dx$ and $dy$ given by Equations 20 and 21 have the form required by Equations 15 and 16, it is demonstrated that the functions selected comply with the requirements specified in the general case. The connections between B and A and between C and A specified by Equations 9a and 10a and the connections between E, F, B and C specified by Equations 13a and 14a thus constitute a specific example of the connections specified more generally by Equations 10 to 16 inclusive.

The form of my invention which I consider best is based on the connections specified by Equations 9a, 10a, 13a and 14a and is indicated schematically in Fig. 5. The symbols used on Fig. 5 have the same significance as on Fig. 4. The dotted arrows on Fig. 5 may be either rotary shaft connections or sliding frame connections.

A mechanism for carrying out the operation shown schematically in Fig. 5 is shown in the perspective view, Fig. 6.

In the distributor part of the apparatus shown in Fig. 6, the actuators E, F are shown as cranks arranged to rotate friction discs 10, 11, which are rotatably mounted as shown in Fig. 7. These two discs are in the same plane. Across the faces of the two discs above and below the discs extend four shafts, 12, 13, 14, 15, each of which is parallel to a line connecting the centers of the discs. On the shafts are splined friction rollers 16, 17, 18, 19 whose peripheries ride on the upper and lower faces of the discs 10, 11. The shafts 14 and 15 are connected to the shaft B by a differential 20 arranged to make the turning movement of the shaft B equal to the sum of the turning movements of the shafts 14 and 15. The shafts 12 and 13 are connected to the shaft C through a differential 21 arranged to make turning movements of the shaft C equal to the difference between the turning movement of the shafts 13 and turning movement of the shaft 12. The longitudinal positions of the discs 16 and 19 on their shafts 12 and 15 is controlled by a sliding frame 22 having a slotted bar 23 engaging a crank 24 on a shaft 25. The longitudinal positions of the discs 17 and 18 on their shafts 13 and 14 is determined by a sliding frame 26 having a slotted bar 27 engaging a crank 28 set at 90° from the crank 24 on the shaft 25. The shaft 25 is connected by gears and a shaft W to the shaft C, so that its turning movements are equal to those of the shaft C.

In the transformer part of the apparatus shown in Fig. 6, the element A has the form of a rod mounted on a slide 40 on an arm 41 fixed to the shaft C. The lower end of the rod A engages a slot 43 in a disc 42 carried by a hollow shaft 44. The slot 43 has the form of an equiangular or logarithmic spiral. The rectangular coordinates of the rod A, referred to perpendicular axes parallel to the disc 42 and intersecting on the axis of this disc and the shaft C, are indicated by slides $Ax$, $Ay$ such as shown in Fig. 4 engaging the rod A.

The transformer part of the apparatus incorporates the connections specified in Equations 9a and 10a. The connections between the shafts B and C and the rod A are such that the shaft B controls the distance between the axis of the disc 42 and the rod A, while the shaft C controls the bearing angle of the rod A from this axis. The arm 41 is driven directly from the shaft C. The disc 42 and hollow shaft 44 are driven by a gear 46 on a shaft 47 extending from a differential 48 which adds together the turning movements of the shaft B and the shaft C. Thus, the turning of the arm 41 is proportional to the turning of the shaft C, while the turning of the disc 42 relative to the arm 41 is proportional to the turning of the shaft B, so that movements of the rod A around the axis of the disc are equal to turning of the shaft C, as required by Equation 10a, while radial movements of the rod A caused by the engagement of the rod with the slot 43 are caused by turning movements of the shaft B and are an anti-logarithmic or exponential function of such turning movements, as required by Equation 9a.

The distributor part of the apparatus incorporates connections operating in accordance with Equations 13a and 14a:

The apparatus is initially so positioned that the distance of the slot in the bar 23 from the center of the shaft 25 and the distance of the rollers 16 and 19 from the centers of the friction discs 10 and 11 is equal to the sine of the angle $g$ which the arm 41 makes with a line parallel to the bar $Ax$; while the distance between the slot in the bar 28 and the center of the shaft 25, as well as the distances between the rollers 18 and 17 and the centers of the friction discs 10 and 11, is equal to the cosine of this angle.

The operation of the device may be understood by considering the effect of turning the actuator E through a small angle $de$. The disc 10 turns the roller 16 and the shaft 12 through an angle proportional to $de \sin g$ because, as has been said, the distance of this roller from the center of the friction disc 10 is equal to $\sin g$. The roller 18 and the shaft 14 are turned through an angle proportional to $de \cos g$. If at the same time the actuator F is independently moved through a small angle $df$, the disc 11 turns the roller 17 and the shaft 13 through an angle proportional to $df \cos g$ and turns the roller 19 and the shaft 15 through an angle proportional to $df \sin g$, the turning movement of the shaft 14, proportional to $de \cos g$, and the turning movement of the shaft 19, proportional to $df \sin g$, are added in the differential 20 so that the turning movement of the shaft B is proportional to $de \cos g + df \sin g$ as required by Equation 13a above. The turning movement of the shaft 12, proportional to $de \sin g$, is subtracted from the turning movement of the shaft 13, proportional to $df \cos g$, in the differential 21, so that the turning movement of the shaft C is proportional to $-de \sin g + df \cos g$ as required by Equation 14a.

Any turning movement given to either actuator, of course, changes the angle $g$ and, therefore, the values of the sine and cosine of this angle; but the connection of the shaft 25, with the shaft C through the shaft W automatically adjusts the positions of the rollers 16, 17, 18, 19 on their shafts so that the distance of the rollers 16 and 19 from the centers of the discs 10 and 11 is maintained equal to $\sin g$, while the distance of the other two rollers 18, 17 from the centers of the friction discs is maintained equal to $\cos g$. The distributor part of the apparatus, therefore, continuously makes the calculations called for by Equations 13a, 14a.

Since the transformer part of the apparatus operates in accordance with Equations 9a, 10a, and the distributor part in accordance with Equations 13a, 14a, any movement of the handle or actuator E moves the rod A parallel to the X axis, while any movement of the actuator F moves the rod A parallel to the Y axis.

In the use of the apparatus, the actuators E and F are manipulated by operators observing the element A. The operator of the actuator E observes movement of the slide Ax and makes such turning movements as are necessary to keep the x-ordinate of the rod indicated by the position of this slide A always equal to given values of the x-ordinate of some object to be followed, while the operator of the actuator F watches the slide Ay and makes such turning movements as are necessary to keep the y-ordinate of the rod A always equal to given values of the y-ordinate of the object. This can be done without any interference, as the movements made by the operator of the actuator E in no way affect the y-ordinate which the operator of the actuator F is controlling, and in the same way movements of the actuator F in no way affect the x-ordinate. So far as the operators of the actuators E and F can see each is merely adjusting a slide indicating one of the rectangular coordinates of the element A; but in doing this by means of this apparatus the two operators cause rotations of the shafts B and C which are functions of the polar coordinates corresponding to the rectangular coordinates which they are adjusting. The shafts B and C may, therefore, be connected so as to operate any apparatus, such as a telescope, or a gun whose position is normally determined by a pair of polar coordinates.

In Fig. 8 is shown a modification of a part of the apparatus shown in Fig. 6. The purpose of the modification is to avoid the use of the friction discs shown in Fig. 6. It will be noted that in Fig. 6 the actuator E is connected to the shafts 12 and 14 through variable-speed transmissions constituted by the disc 10 and rollers 16 and 18, while the actuator F is connected to the shafts 13 and 15 through variable-speed transmissions constituted by the disc 11 and the rollers 17 and 19. I have found that it is possible to substitute positive change-speed transmissions consisting of gear wheels for these frictional transmissions and that it is desirable to do so where the device is used with heavy loads which might cause slippage.

The apparatus shown in Fig. 8 may be substituted for the frictional variable-speed transmission between the actuator F and the shaft 13 which in Fig. 6 is formed of disc 11 and the roller 17, and for the means for controlling this variable-speed transmission, which in Fig. 6 is constituted by the crank 28, the bar 27 and the slide 26. In one complete revolution of the crank 28, which corresponds to a change of 360° in the angle $g$ (owing to the connection between the shaft 25 and the shaft C through the shaft W as heretofore explained), the roller 17 is moved back and forth across the face of the disc 11 so that the gear ratio of the transmission 11—17 varies continuously from +1 to −1 and back to +1 in accordance with changes in the cosine of the angle $g$. While a transmission providing for continuous change of speed in both directions is necessary to make the operation of the apparatus theoretically correct, I have found that an approximation which is satisfactory in practice can be obtained by using a transmission providing for three speed ratios in one direction which correspond to the speed ratios of the frictional transmission when the disc 17 is at three different points at one side of the axis of the disc 11, and three speed ratios in the opposite direction which correspond to three positions of the disc 17 at the left side of the axis of the disc 11 and providing also a neutral position which corresponds to placing the disc 17 on the axis of the disc 11. Such a transmission is shown in Fig. 8.

In Fig. 8 the crank F' is connected by means of bevel gears 47 to two concentric shafts 48, 49, which it thus causes to rotate in opposite directions. A set of change-speed gears connect the shafts 48 and 49 with the shaft 13'. The shaft 48 carries a group of three gears 50, 51, 52, of decreasing diameter. The shaft 49 carries the same number of gears 53, 54, 55, of increasing diameter. A shaft 56 is slidably connected to the shaft 13' and is urged toward the left by means of a spring 57. Upon this shaft there are keyed two groups of three gears 58, 59, 60 and 61, 62, 63. The diameter increases from the gear 58 to the gear 60, which is equal to the gear 61, and then the diameter decreases down to the gear 63. The distances between the various gears that are carried by the parallel shafts 48, 49 and 56, are such that only one of the gears of the shaft 56 can come into engagement with a gear of the shaft 48 or of the shaft 49. In the central position, there is a free point in which none of the gears engage. By shifting the shaft 56 lengthwise, the pair of gears adapted for obtaining a desired gear ratio may be engaged.

The speed ratio of the gear transmission is controlled electromagnetically by a switch arm 76 fixed on a shaft 25' which corresponds to the shaft 25 of Fig. 6 and which, like the shaft 25 is driven by the shaft W so that its turning movements are equal to changes in the angle $g$. The electromagnetic means by which this switch arm controls the gear ratio of the transmission, in the specific form shown in Fig. 8, are as follows:

A tubular casing 64, located on the extension of the shaft 56, encloses two electromagnets 65, 66 which are fixed to this casing. A third electromagnet 67 is aligned with the preceding ones. It is held stationary in a casing 68. The electromagnet 65 has only one winding. The two electromagnets 66 and 67 are each provided with two concentric windings. The effects of these windings annul each other. The movable core of the electromagnet 65 is integral with the shaft 56. The movable core of the electromagnet 66 is integral with that of the electromagnet 67. The stroke of the plunger core of the electromagnet 65 is three units, that of the core of the electromagnet 66 is two units, and that of the core of the electromagnet 67 is one unit. The winding of the electromagnet 65 is connected in series with the inner winding of the electromagnet 66. The outer winding of the latter is connected in series with the inner winding of the electromagnet 67. One end of the two inner windings 66 and 67 and one end of the outer winding 67 are connected to one of the poles of a source of current 69. The winding of 65, and outer winding of 66 and the outer winding of 67, are connected to a series of contact plates, 70 to 75, which are in the form of segments of concentric circles and which partially overlap. These contact plates are traversed by the switch arm 76, the axis of which is connected to the second pole of the source of current. The respective length of each of these segments and their distribution about the axis of rotation of the arm 76 are such that the passage of the arm 76 over them corresponds to various combinations in the excitation of the electromagnets 65, 66, 67. For each of these combinations, the shaft 56 is displaced lengthwise against the force of the spring 57. In a half rotation of the arm 76, the shaft is placed successively in seven different positions which correspond to the engagement of different pairs of gears and to the central free point. When the arm 76 turns through an angle $g$ and the crank F' is turned through a small angle $df$, the shaft 56 and the shaft 13' are turned proportionally to $df \cos g$ with an approximation which is satisfactory in the practical use of the device.

It will be understood that, when the device of Fig. 8 is used to replace the transmission 11—17 of Fig. 6, a precisely similar device is used to replace the transmission 10—18 of Fig. 6, while the transmissions 10—16 and 11—19 of Fig. 6 are replaced by transmissions precisely like that shown in Fig. 8 except that the controlling arm corresponding to the arm 76 of Fig. 8 is mounted on the shaft 25' at 90° from the position of the arm 76.

By a simple modification, the apparatus which has thus far been described may be adapted for obtaining rotary movements which are proportional to the differences between functions of the polar coordinates of two moving points when the differences between the rectangular coordinates of the two moving points are given. In Fig. 9, I have shown the adaptation of my apparatus to this use.

The apparatus shown in Fig. 9 contains two transformers which are substantially similar to the transformer part of the apparatus shown in Fig. 6. The two movable elements $A_1$, $A_2$ shown in Fig. 9 may consist of rods like the rod A of Fig. 6, projecting towards each other so that their opposed ends are in substantially the same transverse plane. The element $A_1$ engages slots in two perpendicular slides 82, 83 and the rod $A_2$ engages slots in similar slides 86, 87. The distance between the slides 82 and 86, $\Delta x$, is the difference between the $x$ ordinates of the elements $A_1$ and $A_2$, while the distance between the slides 83 and 87, $\Delta y$, is the difference between their $y$ ordinates. Two shafts $B_1$, $C_1$ are connected to the element $A_1$ in such manner that turning of the shaft $B_1$ determines the distance of the element $A_1$ from a fixed point 0, while turning of the shaft $C_1$ determines the bearing angle $g_1$ of the element $A_1$ to the point 0. Two shafts $B_2$, $C_2$ are connected to the element $A_2$ in precisely the same manner. The two sets of connections are shown as similar to the connections between the shafts B and C and the element A in Fig. 6 except that a disc $41_1$, $41_2$ with a radial slot is substituted for the arm 41 of Fig. 6; but, in the broadest aspect of the invention, it is necessary merely that the turning movements of the shafts be functions of the polar coordinates of the movable elements as follows:

$$b_1 = f(r_1)$$
$$c_1 = F(g_1)$$
$$b_2 = f(r_2)$$
$$c_2 = F(g_2)$$

A pair of driving shafts $B_3$, $C_3$ are connected directly to the shafts $B_2$, $C_2$, and are connected to the shafts $B_1$, $C_1$ through differentials 88, 89. Another pair of shafts $B_4$, $C_4$ enter the differentials 88, 89, and the differentials are so arranged as to make the turning of the shaft $B_1$ equal to the sum of the turning of the shafts $B_3$, $B_4$, and the turning movement of the shaft $C_1$ equals the sum of the turning of the shafts $C_3$, $C_4$.

Shafts $B_4$, $C_4$ are the output shafts of a distributor which may be precisely like the distributor part of the apparatus shown in Fig. 6, except for a difference in the connection of the return shaft W hereafter explained. The shafts $B_4$, $C_4$ are turned by cranks or actuators E, F which are interconnected with the shafts $B_4$, $C_4$ through variable-speed transmissions in the manner indicated in Fig. 5 and illustrated in Fig. 6. The control for the variable-speed transmissions of the connecting mechanism is, however, not connected to the shafts $B_4$, $C_4$ which correspond to the shafts B and C of Fig. 6, but is connected instead to the shaft $C_1$, through shaft $W_1$. This is necessary because it is the shafts $B_1$, $C_1$, not the shafts $B_4$, $C_4$, which are connected to the element $A_1$, and whose turning movements are, therefore, functions of the polar coordinates of the element $A_1$ required for controlling the variable-speed transmissions of the connecting mechanism between the actuators E, F and the shafts $B_4$, $C_4$. The shaft $W_1$ controls the variable-speed transmissions in the same way as the shaft W of Fig. 6.

It is not essential to use the distributor connections indicated in Figs. 5 and 6 as any type of connections within the scope of the general Equations 13–16 may be used provided that both the transformers produce movements corresponding to Equations 9 and 10.

In the initial setting of the apparatus shown in Fig. 9, the elements $A_1$ and $A_2$ may be set in coincidence so that the slides 82 and 86 are coincident and the slides 83 and 87 are coincident. So long as the actuators E and F are stationary, the shafts $B_1$ and $B_2$ turn together, as do also the shafts $C_1$ and $C_2$, and the elements $A_1$ and $A_2$, therefore, remain coincident.

In the use of the apparatus, an operator stationed at the actuator E observes the slides 82 and 86 and turns the crank E until the slide 82 is separated from the slide 86 by the predetermined distance $\Delta x$. He then continues to make such turning movements of the actuator E as he observes to be necessary in order to maintain the slide 82 constantly at this distance $\Delta x$ from the slide 86. At the same time, a second operator observes the slides 83, 87 and makes such turning movements of the crank F as he observes to be necessary to maintain the slide 83 at the distance $\Delta y$ from the slide 87. These operations may easily be carried out since, as before explained, turning the crank E does not affect the position of the slide 83, while turning of the crank F does not affect the position of the slide 82.

As a result of the turning movements of the cranks E and F, necessary to maintain the slides 82 and 83 at the distances $\Delta x$ and $\Delta y$ from the slides 86 and 87, the turning movements given to the shafts $B_4$ and $C_4$ are as follows:

$$b_4 = b_1 - b_2 = f(r_1) - f(r_2) = \Delta f(r)$$
$$c_4 = c_1 - c_2 = F(g_1) - F(g_2) = \Delta F(g)$$

that is to say, they are the differences between functions of the polar coordinates of two moving points whose rectangular coordinates differ by the given values $\Delta x$, $\Delta y$.

While the modification which has been described is capable of many uses, one valuable use of it is to change the training and elevation of a gun directed at a target in order to direct it at the point where the target will be after the time of travel of the shell, when the difference between the rectangular coordinates of the place where the target is and the place where the target will be after the time of the travel of the shell are known. When used for this purpose, it is sometimes desirable to have the operators of the cranks E and F observe some mechanically determined function of $\Delta x$ and $\Delta y$ rather than observe the values of $\Delta x$ and $\Delta y$ directly. When this is the case, it is desirable to use a modification of the transformer part of the apparatus shown in Fig. 9. This modification is shown in Fig. 10.

The double transformer shown in Fig. 10 is similar to that shown in Fig. 9 except that a single rod $A_3$ is substituted for the two rods $A_1$, $A_2$, and the discs $41_1$ and $42_1$ which position the rod $A_1$ in Fig. 9 are mounted on a movable shaft 90 instead of being mounted on a fixed pivot as they were in Fig. 9. The shaft 90 is mounted in a block 91 which engages and is carried by two slides 92, 93. The slides are mounted on a fixed square frame 94 so that the movement of one slide is at right angles to that of the other. The center 0 of the square frame 94 is on the fixed axis of the discs $41_2$, $42_2$. Because of the movable mounting of the discs $41_1$ and $42_1$, the shafts $C_1$ and $B_1$ are connected to the discs through flexible shafts held at one end on the block 91. One of these flexible shafts 95c is shown in Fig. 10 with its end held in an arm 96 of the block 91.

It will be understood that in the diagrams Fig. 9 and Fig. 10, the four discs are widely separated for the sake of clearness, while, in the actual apparatus, they are, of course, placed close together, and, in the apparatus shown in Fig. 10, close to the frame 94.

The operation of the modified transformer arrangement shown in Fig. 10 is precisely like that of the double transformer shown in Fig. 9, except for such difference as arises from the fact that a single rod $A_3$ replaces the two rods $A_1$, $A_2$ of Fig. 9 and the shaft 90 of the discs $41_1$ and $42_1$ is movable. The rod $A_3$ of Fig. 10 is positioned by the discs $41_2$, $42_2$ in the same way that the rod $A_2$ was positioned by these discs in Fig. 9. If the discs $41_1$ and $42_1$ were stationary, the movement of the rod $A_3$ by the discs $41_2$, $42_2$ would result in a corresponding movement of the movable shaft 90 and the block 91; but when the discs $41_1$ and $42_1$ are turned, the reaction between them and the rod $A_3$ causes a movement of the shaft 90 and block 91 which is the reverse of the movement which is given to the rod $A_1$ by the discs $41_1$ and $42_1$ of Fig. 9. Consequently, the horizontal distance from the slide 92 to the vertical center line of the fixed frame 94 is maintained equal to $\Delta x$, while the vertical distance from the slide 93 to the horizontal center line of the frame 94 is maintained equal to $\Delta y$. $\Delta x$ and $\Delta y$ are thus measured from fixed points, instead of from movable points as in Fig. 9. This is a decided advantage when it is desired to have the operators of the cranks E, F of the distributor observe functions of $\Delta x$ and $\Delta y$, since apparatus for computing these functions may be directly connected to the slides 92 and 93.

The apparatus illustrated in Fig. 9 may be used for obtaining rotary movements which are functions of the polar coordinates of a moving point when the approximate values of these functions are given and exact values of the rectangular coordinates of the point are given. When the apparatus is used for this purpose, the element $A_2$ and the shafts $B_2$ and $C_2$ may be omitted. The driving shafts $B_3$ and $C_3$ are rotated proportionately to the given approximate values of functions of the polar coordinates of the moving point. The actuator E is manipulated to make the observed $x$-ordinate of the element $A_1$ equal to the exact given value of the $x$-ordinate of the moving point, and at the same time the actuator F is manipulated to make the observed $y$-ordinate of the element $A_1$ equal to the given exact value of the $y$-ordinate of the moving point. The result of this manipulation is that the shafts $B_1$, $C_1$ are turned in proportion to functions of the exact values of the polar coordinates of the moving point.

The turning of the shafts $B_1$ and $C_1$ thus obtained are the same as the turning of the shafts B and C obtained by the apparatus of Figs. 5, 6 and this result is secured with very much less turning of the actuators E and F than is required in the apparatus of Figs. 5 and 6, since the major part of the turning movements of the shafts $B_1$ and $C_1$ come from the driving shafts $B_3$, $C_3$.

(2) *Training and elevating apparatus*

This apparatus provides automatic means for varying the trailing and elevation angles of an instrument to keep the axis of the instrument directed at a point moving on a fixed course at a constant height at a constant speed.

The apparatus includes training and elevating shafts connected to a telescope or other instrument, constant speed motors connected to these shafts through variable-speed transmissions, and controls for the transmissions which, when set in accordance with the constants of the target's movement (course angle, height and speed), control the transmissions so as to keep the telescope directed at the target. The use of complicated calculating mechanism in the controls of the variable-speed transmissions is avoided by connecting the elevating shaft to the telescope in such manner that any turning movement of this shaft is proportional to the logarithm of the cotangent of the angle by which this turning movement changes the elevation of the telescope.

I will first explain the principle of the invention. Fig. 11 shows the course HG of an airplane which is assumed to be flying along this course at a constant speed $c$ and a constant height $h$. KJ is a projection of the course HG on a horizontal plane containing the point 0 at which a telescope is located. 00' is a fixed vertical plane of reference from which bearing angles are measured. The course HG makes an angle $a$ wtih the plane 00'. The constants of the airplane movement are, therefore, the course angle $a$, the height $h$ and the speed $c$.

The changes which must be made in the training or bearing angle $g$ and the elevation angle $s$ of the telescope located at $O$ in order that the telescope may follow the airplane depend upon the constants $a$, $h$ and $c$, but the rate of change or time derivative of the elevation angle $s$ does not bear a simple relation to these constants.

I have discovered that the time derivative of the logarithm of the cotangent of the angle of elevation bears a relation to the three constants of the target movement which is simple and analogous to the relation of the time derivative of the bearing angle to these constants. I will first point out what these relations are and then show how I have utilized them to provide a simple mechanical apparatus for maintaining the telescope pointed at the airplane.

It appears from Fig. 11, which indicates movement of the airplane from $G$ to $G'$ and of its projection from $J$ to $J'$ in a small time element $dt$, that $$cdt \sin (a-g) = h \cot s \, dg \quad (22)$$

and $$cdt \cos (a-g) = d(h \cot s) = hd \cot s \quad (23)$$

From Equation 22, the time derivative of the bearing angle $g$ may be derived as follows:

$$\frac{dg}{dt} = \frac{c}{h} \cdot \frac{\sin (a-g)}{\cot s} \quad (24)$$

and from Equation 23, the time derivative of the logarithm of the cotangent of the elevation angle $s$ $$\frac{d \log \cot s}{dt}$$

which by differentiation is equal to $$\frac{1}{\cot s} \cdot \frac{d \cot s}{dt}$$

may be derived as follows:

$$\frac{d \log \cot s}{dt} = \frac{c}{h} \cdot \frac{\cos (a-g)}{\cot s} \quad (25)$$

It will be noted that Equations 24 and 25 show that the two time derivatives selected bear simple and analogous relations to the three constants $a$, $c$ and $h$. The values of the two time derivatives differ only in that one of them involves the sine of the angle $(a-g)$, while the other involves the cosine of the same angle. The values given by the two equations are, therefore, the rectangular coordinates of a point whose polar coordinates are:

$$\omega = a - g \quad (26)$$

$$\rho = \frac{c}{h} \cdot \frac{1}{\cot s} \quad (27)$$

My apparatus is based on Equations 24 and 25.

Fig. 12 shows an embodiment of my training and elevating apparatus in which the constants $a$, $h$ and $c$ of the target's movements are introduced manually. Training and elevating shafts are connected to a telescope 100 in such manner that the training or bearing angle $g$ of the telescope is proportional to turning movements of the shaft 110, while the elevating angle $s$ of the telescope is proportional to the anti-cotangent of the anti-logarithm of turning movements of the shaft 111. The shafts 110 and 111 are turned by the constant speed motor (not shown) which drives two friction discs 112, 113 at constant speeds. In the drives are incorporated variable-speed transmissions 114, 115. A control 116 for the variable-speed transmissions is set in accordance with the constants of the target's movement, and, when so set, regulates the transmissions to drive the training shaft 110 at the speed given in Equation 24 and the elevating shaft 111 at the speed given in Equation 25.

The connection between the training shaft 110 and the telescope is as follows: A gear 120 on the shaft 110 engages a gear 121 fixed on a hollow shaft 122. At the upper end of the hollow shaft 122 is a gear 123 meshing with a gear 124 of a shaft 125 journalled on a pivoted frame 126 of the telescope 100. Shaft 125 carries a pinion 127 meshing with a fixed circular gear rack 128. The training of the telescope is, therefore, proportional to the turning of the training shaft 110, and, for simplicity, it will be assumed that the gear ratios are such that any angular turning of the shaft 110 turns the telescope frame through the same angle as that through which the shaft 110 is turned.

The connection between the elevating shaft 111 and the telescope 100 is as follows: A crank 130 on the rocking arm 131 of the telescope 100 engages a spiral groove 132 in a disc 133 mounted on the pivoted frame of the telescope. The disc 133 is driven through a gear 134 which is fixed on a shaft 136 which passes through the hollow shaft 122. The shaft 136 is driven from a differential 137 which adds the turning movements of the shafts 110 and 111 so that the turning of the shaft 136 relative to the hollow shaft 122 and the pivoted frame of the telescope is equal to the turning of the elevating shaft 111. The connection described is such that, when the elevating shaft 111 is turned to elevate the telescope through an angle $s$, the turning movement of the shaft 111 which causes this elevation is proportional or equal to log cot $s$.

The connections between the variable-speed transmissions 114 and 115 and the training and elevating shafts 110 and 111 include means for supplementing the mechanical turning of these shafts by manual turning. The output shaft 140 of the transmission 114 is geared to shaft 141, and a shaft 142 which may be turned by a hand wheel 143 enters a differential 144 which adds the movements of the shafts 141 and 142 and transmits the sum to the training shaft 110 through a shaft 145 and gears 146. The output shaft 147 of the transmission 115 and a hand wheel 148 are similarly connected to the elevating shaft 111 through a differential 149. The shafts 141 and 147 may contain clutches 141a and 147a to permit disconnecting of the mechanical drive so that the training and elevating shafts may be turned directly by the hand wheels 143 and 148 in the initial setting of the telescope.

The variable-speed transmissions 114, 115 are shown diagrammatically as consisting of friction wheels 150, 151 movable diametrically across the constant-speed, motor-driven friction discs 112, 113. The wheels 150, 151 are mounted on sliding hollow shafts 152, 153 keyed to the output shafts 140, 147 of the transmissions.

The controlling mechanism 116 for the variable-speed transmission is connected to the training and elevating shafts 110 and 111 and also with three hand wheels 154, 155, 156 which are turned to set the controlling mechanism in accordance with the constants of the target's movement.

The hand wheel 155 is turned until the constant course angle $a$ of the target appears under a fixed pointer 157 on the dial 158 geared to the shaft 159 on which the hand wheel is mounted. The shaft 159 which is thus turned proportionately to the course angle $a$ and a shaft 160 connected to the training shaft 110 by gears 161 enter a differential 162 which subtracts the turning of the shaft 160 from the turning of the shaft 159. Consequently, the output shaft 163 of this differential is turned proportionately to the difference between the bearing angle of the telescope and the course angle of the target, that is to say, in proportion to $a-g$.

The hand wheel 156 is turned until the constant height $h$ of the target appears over the fixed pointer 164 on a dial 165 geared to the shaft 166 on which the hand wheel 156 is mounted. The dial 165 contains a logarithmic scale so that in setting the dial at $h$ the hand wheel 156 and shaft 166 are given a turning movement proportional to log $h$. Another dial 167 is also geared to the shaft 166 so that the turning movements of this dial are equal to log $h$.

The hand wheel 154 is turned until a pointer 168 geared to a shaft 169 which is turned by the shaft 170 on which the hand wheel 154 is mounted indicates on the dial 167 the constant speed $c$ of the target. The dial 167 is logarithmically graduated so that the setting of the pointer 168 by the hand wheel 154 after the hand wheel 156 has been set results in turning the shafts 170 and 169 through an angle proportional to log $c$—log $h$ which is, of course, equal to $$\log \frac{c}{h}$$

The shaft 169 which is thus turned proportionately to $$\log \frac{c}{h}$$

and the shaft 171 connected to the elevating shaft 111 by gears 172 so that, like the elevating shaft, it turns proportionately to log cot $s$, enter a differential 173. The turning movements of these two shafts are subtracted in this differential so that the output shaft 174 of the differential is turned proportionately to $$\log \frac{c}{h} - \log \cot s$$

which equals $$\log\left(\frac{c}{h} \cdot \frac{1}{\cot s}\right)$$

The shaft 163 and the shaft 174 are connected to a transformer 180 which transforms polar coordinate movements into rectangular coordinate movements like the transformers shown in Fig. 9. The transformer 180 consists of two coaxial rotatable slotted discs 181, 182 and a pin A engaging the slot in each disc.

The disc 181 is turned by the shaft 163 through gearing 184, a shaft 185 and a worm 186, and the gear ratios are so chosen that turning movements of this disc are equal to $(a-g)$. The disc 181 contains a radial slot 187 which positions the pin A so that its bearing angle from a fixed reference line through the axis of the discs is equal to $(a-g)$.

The disc 182 is driven by a worm on the output shaft 189 of a differential 190 which adds the movements of the shafts 163 and 174, so that the turning of the disc 182 with respect to the disc 181 is proportional to the turning of the shaft 174 proportional to $$\log\left(\frac{c}{h} \cdot \frac{1}{\cot s}\right)$$

The disc 182 contains a slot 191 in the form of an equiangular spiral so that the turning of this disc in relation to the disc 181 positions the rod A at a distance from the axis of the discs proportional to $$\frac{c}{h} \cdot \frac{1}{\cot s}$$

The pin A engages two slotted slides 192, 193 which slide at right angles to each other. The distance of the slot in the slide 192 from the center of the discs 181, 182 is, therefore, equal to one rectangular coordinate, while the distance from the slot in the slide 193 to the center of the discs is equal to the other rectangular coordinate of the rod A whose position is determined by the two polar coordinates $(a-g)$ and $$\frac{c}{h} \cdot \frac{1}{\cot s}$$

and, therefore, represent the values specified by the Equations 24 and 25. The slide 192 is connected to the transmission 114 in such a way as to position the friction wheel 150 at a distance from the axis of the friction disc 112 equal to the distance from the slot in this slide to the axis of the discs 181, 182, and the slide 193 is similarly connected to the transmission 115. It follows that the speeds at which the two transmissions drive the training shaft 110 and elevating shaft 111 are the speeds given by the Equations 24 and 25.

In using the apparatus of Fig. 12, the telescope 100 is first directed at an airplane by turning the hand wheels 143 and 148 with the clutches 141a and 147a disconnected. The clutches are then closed and the controlling apparatus 116 are set in accordance with the constants of the airplane's movement by (1) turning the hand wheel 155 until the dial 158 is set to the value $s$ (course angle), (2) turning the hand wheel 156 until the dial 165 is set to the value $h$ (height of airplane), and (3) then turning the hand wheel 154 until the pointer 168 is set on the disc 167 to the value of $c$ (speed of airplane). During the setting operation, the hand wheels 143 and 148 are turned sufficiently to keep the telescope pointed at the airplane, but, as soon as the setting has been made, the telescope will automatically follow the airplane without any further turning of any of the hand wheels so long as the course angle, height and speed of the airplane remain constant.

In order to use the apparatus in the manner described, it is, of course, necessary that the three constants of the airplane's movement be known shortly after the airplane is first seen. As a rule, they are known only approximately at this time so that the first setting of the hand wheels 155, 156 and 154 is only approximate. In this case, some slight turning of the hand wheels 143 and 148 is necessary to follow the airplane in the telescope. This continues to be the case until the constants of the airplane's movement have been determined accurately. The hand wheels 155, 156 and 154 are then reset more accurately so that further turning of the hand wheels 143 and 148 becomes unnecessary.

In Fig. 13, I have shown an auxiliary apparatus which may be used with the training and elevating apparatus shown in Fig. 12 to facilitate accurate resetting of the hand wheels 155 and 154. This apparatus makes use of the motion of the telescope in following the target to indicate the proper setting of the hand wheels 155 and 154. The auxiliary apparatus shown in Fig. 13 consists of two juxtaposed but independent transformers.

The transformer 200 shown in the lower part of Fig. 13 transforms polar coordinate movements into movements proportional to the first time derivative of, or the rate of change of, the corresponding rectangular coordinates. It includes two slotted discs $181_1$ and $182_1$ containing respectively a radial slot $187_1$ and a spiral slot $191_1$. A pin A has one of its ends mounted in a slide $201$ engaging the slot $187_1$, and extends through the spiral slot $191_1$ and has its other end fixed in a block 202. It is apparent, therefore, that the pin A and the block 202 will be positioned in accordance with two polar coordinates, the $\omega$-coordinate being equal to the angular turning of the disc $181_1$ and the $\rho$-coordinate being an antilogarithmic function of the turning movement of the disc $182_1$ relative to the disc $181_1$.

Two perpendicular shafts 203, 204 are rotatably and slidably mounted in the block 202. The shaft 203 bears two pinions 205 of equal radius running on parallel racks 206 so that its rotation caused by horizontal displacement of the pin A and block 202 is proportional to the $x$ ordinate of the pin A. The shaft 204 carries pinions 207 running on racks 208 perpendicular to the racks 206 so that it turns proportionately to the $y$ ordinate of the rod A.

The shaft 203 carries a worm gear 209 larger than the pinions 205 engaging a worm 210 fixed on a shaft 211 which is slidably and rotatably mounted. On the shaft 211 is a friction wheel 212 engaging a friction disc 213 which is rotated at constant speed by a motor not shown in the drawings. The axis of the friction disc 213 intersects the axis of the shaft 211 at right angles. The rotation of the disc 213 is in a clockwise direction as indicated by the arrow, while the worm 210 has a right-hand thread so that the rotation of the wheel 212 and worm 210 caused by the disc 213 tends to move the wheel 212 to the center of the disc 213. At the same time, the worm wheel 209 tends to displace the shaft 211 and wheel 212 from the center of the disc 213 whenever the shaft 203 is displaced from the center of the racks 206. As a result of an equilibrium between these tendencies, the distance between the wheel 212 and the center of the disc 213 is a measure of the first time derivative of lateral movements of the shaft 203 which is the first time derivative of the $x$-ordinate of the pin A. Mechanism precisely similar to that described connected with the shaft 204 makes the distance from the center of a constant speed disc 214 to a friction wheel 215. A measure of the first time derivative of changes in the $y$-ordinate of the pin A. Axial movements of the friction wheels 212 and 215 and their shafts 211 and 216 are transferred to two perpendicular transparent bars 217, 218 bearing straightline marks whose distances from a fixed point 0 are a measure of the first time derivatives of the $x$ and $y$-ordinates of the pin A.

The transformer 220 shown in the upper part of Fig. 13 is a visual device for indicating the rectangular coordinates corresponding to polar coordinate movements. It consists of two coaxial discs of which one, $182_2$, bears an equiangular spiral mark $191_2$, and the other, $181_2$, is transparent and bears a radial mark $187_2$. The distances from the intersection of the two marks, which may be observed visually, to two perpendicular axes passing through the axis of the discs indicate the rectangular coordinates of a point whose polar coordinates are equal to the turning movement of the disc $181_2$ and the antilogarithm of the relative turning movement of the disc $182_2$.

When the two transformers 200, 220 shown in Fig. 13 are used as auxiliary apparatus with the training and elevating apparatus shown in Fig. 12, they are juxtaposed as shown with the discs of the transformer 220 under the bars 217, 218 of the transformer 200 and with the axis of these discs passing through the fixed point 0 to which the movements of these bars are referred. The transformer 200 is connected to the training and elevating shafts 110, 111 and the hand wheel 156, while the transformer 220 is connected with the hand wheels 155, 154.

The connections of the transformer 220 are as follows: The shaft 166 of Fig. 12 on which the hand wheel 156 is mounted is directly connected to the shaft 221 of Fig. 13. The shaft 170 of Fig. 12 on which the hand wheel 154 is mounted is connected to a shaft 222 of Fig. 13 which is geared to a shaft 223 carrying a hand wheel 154' which replaces the hand wheel 154 of Fig. 12. The shaft 159 of Fig. 12 on which the hand wheel 155 is mounted is connected to a shaft 224 of Fig. 13 which is geared to a shaft 225 carrying a hand wheel 155' which replaces the hand wheel 155.

The shaft 221 connected to the shaft 166 so that it is turned proportionately to the $\log h$ by the hand wheel 156 and the shaft 223 which is turned proportionately to $$\log \frac{c}{h}$$

by the hand wheel 154' which is set in the same way as the hand wheel 154 enter a differential 226 where their turning movements are added so that the output shaft 227 has a turning movement of $$\log h + \log \frac{c}{h}$$

or $\log c$. The shaft 225, which is turned through the angle $a$ by the hand wheel 155' which is set in the same way as the hand wheel 155, is geared to the disc $181_2$ bearing the radial mark $187_2$. The turning movements of the shafts 227 and 225 are added in a differential 228, and the output shaft 229 of this differential is geared to the disc $182_2$ which carries the spiral mark $191_2$ so that the turning of this disc relative to the disc $181_2$ is proportional to the turning of the shaft 227 and is made as so proportional to $\log c$. The intersection of the lines $187_2$ and $191_{2'}$ therefore, represent the position of a point whose polar coordinates are the course angle $a$ and the constant speed $c$, or rather the approximate values of these two constants by which the hand wheels 154' and 155' have been set.

The connections between the transformer 200 and the training and elevating apparatus of Fig. 12 are as follows: The shaft 230 of Fig. 13 is a continuation of the shaft 160 of Fig. 12 which is geared to the training shaft 10 so that it turns in proportion to the training angle $g$ of the telescope. The shaft 231 of Fig. 13 is shown in dotted lines in Fig. 12 and is geared directly to the elevating shaft 111 so that its turning is proportional to log cot $s$. The shaft 232 of Fig. 13 is connected to the shaft 166 of Fig. 12 on which the hand wheel 156 is mounted so that in setting the hand wheel 156 it is turned through an angle proportional to log $h$. The turning movements of the shafts 231, 232 are added in a differential 233 so that the output shaft 234 of this differential turns in proportion to (log cot $s$+log $h$) or log ($h$ cot $s$)

The shaft 230 turns the disc $181_1$ through a shaft 235 so that the turning of this shaft is equal to the training angle $g$. The shaft 234 and a shaft 236 geared to the shaft 230 enter a differential 237 where their turning movements are added, and the output shaft 238 of this differential is geared to the disc $182_1$ so that the turning movement of this disc relative to the disc $181_1$ is proportional to the turning movement of the shaft 234 and to log ($h$ cot $s$).

As a result of the turning movements of the discs $181_1$ and $182_1$, the rod A is given a position determined by the polar coordinates $g$ and $h$ cot $s$. It is evident from Fig. 11 that these are the polar coordinates of the point J which is a horizontal projection of the position of the airplane. The lateral displacements of the shafts 203, 204 are, therefore, proportional to the rectangular coordinates of a horizontal projection of the airplane (see Fig. 14):

$$x = h \cot s . \cos g$$
$$y = h \cot s . \sin g$$

The distances $x'$, $y'$ from the marks on the bars 217, 218 to the axis of the discs $181_2$, $182_2$, which as has been said are the first time derivatives of the displacements of the shafts 203, 204, are, therefore, proportional to the first time derivatives of the rectangular coordinates of the horizontal projection of the airplane, that is:

$$x' = \frac{dx}{dt}$$

and $$y' = \frac{dy}{dt}$$

It appears from the upper triangle in Fig. 14 that $$\frac{dx}{dt} = c \sin a$$

and $$\frac{dy}{dt} = c \cos a$$

so the $x'$ is proportional to $c \sin a$, and $y'$ is proportional to $c \cos a$.

It follows that if the values of the constants $c$ and $a$ to which the cranks 154' and 155' were correct, the intersection of the lines on the bars 217 and 218 would coincide with the intersection of the radius and spiral on the discs $181_2$ and $182_2$.

In using the auxiliary apparatus of Fig. 13 with the training and elevating apparatus of Fig. 12, the hand wheel 156 (Fig. 12) and the hand wheels 155' and 154' (Fig. 13) are first set in accordance with the approximate values of the constants $h$, $a$ and $c$ just as the hand wheels 156, 155 and 154 were set in using the apparatus of Fig. 12 alone, and the hand wheels 143 and 148 are then manipulated to such extent as is necessary to make the telescope 100 follow the airplane. While the telescope continues to follow the airplane by adjustments of the hand wheels 143 and 148, the hand wheel 154' is reset to bring the spiral mark $191_2$ exactly through the intersections of the marks on the bars 217 and 218, and the hand wheel 155' is reset to bring the radius mark $187_2$ directly through the intersection of these lines. As soon as this has been done, it becomes unnecessary to make further adjustments of the hand wheels 143 and 148 and the telescope continues to follow the airplane automatically so long as the course, speed and height of the airplane remain constant. This is true even if the value of $h$ by which the hand wheel 156 was set is incorrect.

In Fig. 15, I have shown a combination of the training and elevating apparatus of Fig. 12 and the apparatus of Fig. 9 used without the shafts $B_2$ and $C_2$ and the transformer connected with those shafts, as described on page 7.

The apparatus shown in Fig. 19 contains a distributor having two manually-operated handles or actuators E, F so connected to two shafts $B_4$, $C_4$ as to control independently of each other the rectangular coordinates of a pin $A_1$ whose polar coordinates are functions of the turning movements of two shafts $B_1$, $C_1$ which are derived partly from the shafts $B_4$, $C_4$ and partly from two driving shafts $B_3$, $C_3$. In Fig. 15 I have shown precisely such an apparatus including a distributor D having actuators E, F and shafts identified by the same symbols as the corresponding shafts in Fig. 19. The shafts $C_1$ and $B_1$ correspond to the shafts 185 and 174 shown in Fig. 12 and, like them, are connected to the two discs of the transformer 180 so that the pin A of this transformer corresponds to the pin $A_1$ of Fig. 19. This pin A is connected so that its rectangular coordinates control the variable-speed transmissions 114 and 115 through which the training and elevating shafts 110, 111 of the telescope 100 are driven precisely as shown in Fig. 12. The actuators E and F of the distributor D are connected to the shafts of the hand wheels 143 and 148 by means of shafts 240, 241.

In order to explain the principle of the combined apparatus shown in Fig. 15, it is necessary to refer again to Equations 24, 25, 26 and 27 which show that, when the telescope is following a target moving at a constant speed and height on a fixed course, the rate of turning of the training and elevating shafts 110 and 111 must be proportional to the rectangular coordinates of a point whose polar coordinates are $$\omega = a - g$$

and $$\rho = \frac{c}{h} \cdot \frac{1}{\cot s}$$

Now consider what happens in the apparatus shown in Fig. 15 when the operators stop manipulating the hand wheels 143 and 148 at the moment the telescope has been pointed at the moving target. In this case, the movement of the shafts 110 and 111 will be actuated only by the variable-speed transmissions 114 and 115. The angular position of the shaft 159 is obviously not proportional to the true value of $a$, but to the incorrect value $a^*$. The angular position of the shaft 170 will likewise be not proportional to the true value of $$\log \frac{c}{h}$$

but the incorrect value $$\left( \log \frac{c}{h} \right)^*$$

The polar coordinates of the pin A will have incorrect values:

$$\omega = a^* - g$$

$$\rho = \left(\frac{c}{h}\right)^* \cdot \frac{1}{\cot s}$$

Therefore, the rectangular coordinates of the pin A will be incorrect as well as the angular speeds in the training $g$ and in the log cot of the elevation. The movement of the telescope caused now by the variable-speed transmissions controlled by mechanism 116 will correspond to the incorrect values $a^*$ and $$\left(\log \frac{c}{h}\right)^*$$

and cause the telescope to follow an imaginary target whose course angle is $a^*$ and $$\frac{\text{speed}}{\text{height}} \text{constant is } \left(\frac{c}{h}\right)^*$$

It is clear that if the operators want to maintain the telescope pointed at the actual moving target, they are obliged to manipulate the hand wheels 143 and 148. When the angular speed of the variable transmission 114 is too low, that is when the $x$ coordinate of the pin A is also too low, the hand wheel 143 must be turned in one (called positive) direction. On the other hand, when the angular speed of the variable transmission 114 is too high, that is, when the $x$ coordinate of the pin A is also too high, the hand wheel 143 must be turned in the opposite (called negative) direction. It thus appears that the sign of the $x$ component of the correction in the position of pin A is the same as the turning direction of hand wheel 143 (i. e. positive or negative). The same applies to the variable-speed transmission 115, the $y$ coordinate of pin A, and the hand wheel 148.

When the hand wheels 143 and 148 are turned so as to readjust the telescope to the target, the adjustment is made by adding the turning of the hand wheels 143 and 148 to the turning of the shafts 141 and 147 in the differentials 144, 149. But, at the same time the hand wheel 143 turns the actuator E of the distributor D while the hand wheel 148 turns the actuator F. The turning of the actuator F by the training hand wheel 143 turns the shafts B4 and C4 so as to cause the pin A to move the slide 192 without moving the slide 193, and thus to change the rate of rotation of the shaft 141 connected to the training shaft 110 without affecting the shaft 147 or the elevating shaft 111. At the same time, the turning of the actuator F by the elevating hand wheel 148 acts through the shafts B4, C4, the pin A and the slide 193 to change the rate of turning of the shaft 147 connected to the elevating shaft. These changes are in a direction to make the turning of the shafts 141 and 147 more nearly the correct rate of turning for following the target. So long as it is necessary to turn the training hand wheel 143 in order to keep the telescope on the target, the rate of turning of the shaft 141 continues to be adjusted through the actuator E and the shafts B4, C4 until the rotation of the shaft 141 finally reaches the correct rate of rotation as given by Equation 24. The operator of the hand wheel 143 then finds that no further turning of the wheel is necessary in order to hold the telescope on the target. In the same way the operator of the elevating hand wheel 148 soon finds that no further turning of the hand wheel 148 is necessary because of the adjustment of the speed of the elevating shaft which has been made through the actuator F.

Thus in the use of the combined apparatus shown in Fig. 15, operators of the training and elevating hand wheels 143, 148 separately adjust the training and elevating of the telescope 100 to follow the target just as if the training and elevating were being done entirely by hand. As the operators continue to adjust the training and elevating, they find that less and less movements of the hand wheel are required to follow the target and, in a few moments, they stop turning the hand wheels altogether and the telescope continues automatically to follow the target so long as the course, height and speed of the target remain constant. If any one of the elements of the target is changed, that is to say, for example, if the airplane should change its course, it would be necessary to start turning the hand wheels 143 and 148 again in order to keep the telescope 100 directly on it. But, if the new course is held constantly, the necessity for turning the hand wheels soon ends and the telescope continues automatically to follow the target on its new course. It is apparent that this permits following a moving target with the telescope much more easily and accurately than any training and elevating apparatus heretofore used.

If Figs. 12 and 15 be compared, it is evident from the similarity of the controls of the transmissions that, as soon as the telescope begins to follow the target automatically in the apparatus of Fig. 15, the distributor has turned the shafts B4 and C4 of Fig. 15 to the same extent as the shafts 170 and 159 of the apparatus of Fig. 12 were turned by the hand wheels 156, 154 and 155 in setting up the constants of the airplane's course on the dials 165, 167 and 158. These dials may, therefore, be retained as indicators in the apparatus of Fig. 15. As soon as the telescope has begun to follow the airplane automatically in the apparatus of Fig. 15, the course angle of the airplane may be read from the dial 158, and, after the dial 165 has been set to the height of the airplane by the crank 156, the speed of the airplane may be read from the dial 167.

To relieve the variable transmission 114 of the load which it would bear in swinging a heavy telescope frame, it is desirable to provide an air motor, spring motor, or similar device 250, geared to the training shaft 110, or to the hollow shaft 122, and tending to turn these shafts in the direction required to follow the airplane. The worm and connections at 251 and 252 prevent the motor 250 from turning the shaft 152 or the hand wheel 143. The motor 250, therefore, acts only when the shaft 152 or the hand wheel 143 is turned, and when one or both of them are turned the motor 250 assists them in training the telescope.

(3) Predictor

This is a computing device or predictor for indicating the value which a function of time will have after a variable predetermined time interval. The device is of value in fire director apparatus and for other purposes, and forms the subject matter of my application Serial No. 462,626 filed October 19, 1942, as a division of this application.

Predicting the value of a function of time on the basis of the first time derivative of the function gives inaccurate results where the function is complicated. An example of a time function which cannot safely be predicted in this manner and the tangent of the angle $\beta$ which the rod 372 makes with a line parallel to the center line is equal to the second time derivative of the function $$\frac{d^2f(t)}{dt^2}$$

In the triangle OPQ $$PQ = OQ \tan \beta$$
$$= \frac{T}{2} \cdot \frac{d^2f(t)}{dt^2}$$

In the triangle OMN $$ON = \frac{df(t)}{dt} + \frac{T}{2} \cdot \tan \beta$$
$$= \frac{df(t)}{dt} + \frac{T}{2} \cdot \frac{d^2f(t)}{dt^2}$$

and $$NM = ON \cdot \tan \alpha$$

where $\alpha$ is the angle between the bars 371 and 373, so that $$\tan \alpha = KT$$

where K is a constant.
Consequently $$NM = \left(\frac{df(t)}{dt} + \frac{T}{2} \cdot \frac{d^2f(t)}{dt^2}\right) \cdot KT$$
$$= K\left(\frac{df(t)}{dt} \cdot T + \frac{T^2}{2} \cdot \frac{d^2f(t)}{dt^2}\right)$$

NM, which is equal to the distance through which it was necessary to displace the bar 373 from its zero position where it intersected the bar 371 at N to the position where it intersects the bar 371 at O, is thus proportional to the required correction $\Delta f(t)$, so that this correction may be read directly from the dial 366 which indicates the sliding movement of the rod 360. If the value of $$\frac{df(t)}{dt}$$

is measured with a time lag of $i$ seconds, the apparatus cannot indicate the exact value of $\Delta f(t)$ to obtain a very close approximation to the correct value of $\Delta f(t)$. It is sufficient to modify the apparatus with only the following change: Both the slide bearings of the rod 320 are shifted by the amount $i$ measured on a scale representing the rate of turning of the drum, so that the slide rod 320 will have the position indicated by a dotted line.

(4) Second predictor

This is a computing device or predictor for indicating the value which a function of time will have after a fixed, predetermined time interval, $k$. The device is of value in fire director apparatus and for other purposes, and forms the subject matter of my application Serial No. 462,627 filed October 19, 1942, as a division of this application.

The device indicates a close approximation to the value of the correction given by the first three terms of Taylor's equation. In so doing, it also indicates a close approximation to the value of the second time derivative of the function and may, in some cases, be useful simply as a means for indicating acceleration.

The device shown in Fig. 17 has a frame 410 on which are mounted two rotatable shafts 411, 412 which are geared to the shaft 413 of a constant speed motor so that they are driven at a constant speed in the same direction. On the shafts 411 and 412 are splined two drums 414, 415. A rod 416 is slidable in the frame 410 and is given a sliding movement equal or proportional to $f(t)$, the function whose value is to be predicted. The means for giving the rod 416 this movement, of course, depends upon the nature of the function and is not shown in the drawing as it forms no part of the predicting device. Also, so far as the predicting device is concerned, the movement of the rod 416 in accordance with the function may be caused either mechanically or manually. The rod 416 carries a free roller 417 having a groove engaging flanges 418, 419 on the cylinders 414, 415, so that the cylinders are given longitudinal movements corresponding to $f(t)$.

Two rods 420, 421 are pivoted on the frame 410 at the fixed point 422 and extend across the rollers 414, 415. The rods carry rollers 423, 424 riding on the drums 414 and 415 and have at their ends marks 425, 426 or other means to facilitate observing the positions of points 427, 428 near the ends of the rods. Each rod thus consists in effect of a wheel-carrying arm extending from the pivot 422 to the axis of its wheel and an indicating arm extending from the pivot 422 to the center of its mark. It should be noted that the length $a_1$ of the wheel-carrying arm of the rod 420 is less than the length of the wheel-carrying arm $a_2$ of the rod 421, while the length of the indicating arm $b_2$ of the rod 421 is less than the length $b_1$ of the indicating arm of the rod 420. The lengths of the two arms of the two rods are related by the following formula:

$$k = \frac{b_1 a_1 - b_2 a_2}{v(b_1 - b_2)}$$

where $k$ is the length of time between the moment of observation and the moment for which the value of the function is to be predicted, and $v$ is the peripheral speed of the drums 414, 415.

In the lower part of the drawing is shown a device for reading the tangent of the angle $\alpha$ which a line connecting the points 427 and 428 of the rods 420 and 421 makes with a line perpendicular to the axis of the cylinders 414 and 415. In the form shown, the reading device consists of a semi-circular transparent disc 430 pivoted on the frame 410 at 431 and bearing a series of parallel rulings 432 which are perpendicular to its diameter. A nut 433 on a worm 434 carries a pin 435 engaging a diametrical slot 436 in the disc 430 or in an arm 437 extending radially from the disc. A crank 438 is provided for turning the worm 434, and a dail 439 is geared to the shaft of the worm 434. By turning the crank 438 so as to make a line between the points 427 and 428 of the rods 420, 421 coincident with or parallel to one of the rulings on the disc 430, the dial 439 is made to indicate the tangent of the angle $\alpha$ between the line connecting the points 427 and 428 and a line perpendicular to the axes of the cylinders 414, 415. The gearing and graduation of the dial are such that readings of the dial give a value K tan $\alpha$, where K is a constant.

In considering the operation of this device, it may be assumed first that $f(t)$ is a simple function such that $$\frac{df(t)}{dt}$$

is a constant. In this case, the rod 416 will be moved at a constant speed and the rods 420, 421 and their rollers will become mere speed indicais a coordinate of the impact point on the path of an airplane which is moving on a curved course or at a variable speed. In order to predict a complicated time function such as this accurately, it is necessary to take account of the second time derivative of the function and to base the prediction on at least the first three terms of Taylor's equation, that is to say, it is necessary to add to the present value of the function a correction $$\Delta f(t)$$

whose value is $$\Delta f(t) = T \cdot \frac{df(t)}{dt} + \frac{T^2}{2} \cdot \frac{d^2f(t)}{dt^2} \quad (28)$$

in order to predict the value which $f(t)$ will have after an interval of T seconds.

The device which I have invented indicates instantly the value of this correction $\Delta f(t)$ when T is a variable and provides for taking account of the instantaneous value of T at the moment of prediction.

The apparatus shown in Fig. 16 has a frame 310 on which is journalled a drum 311 which is rotated at constant speed by a constant speed motor connected to the shaft 312 which is geared to the shaft 313 of the drum.

A rod 320 is slidably mounted in the frame 310 and is given a sliding movement equal to the function $$\frac{df(t)}{dt}$$

(The means for giving the rod 320 this movement is, of course, essentially a speed indicator connected with the part moved in proportion to values of the function. It is not shown in the drawings, as it forms no part of the predicting device.) On the slide rod 320 is pivoted an arm 322 which carries a roller 323 riding on the drum 311.

A shaft 330 rotatably mounted on the frame 310 is turned manually or by mechanism outside the device in proportion to the variable time-interval T, so that the amount by which the shaft 330 has turned from an initial zero position always represents the instantaneous value of the time-interval T.

A shaft 340 is rotatably mounted in the frame and geared to the shaft 330 so that it turns in proportion to T. On the shaft 340 is fixed a worm 341. On this worm is a nut 342 which is held against rotation. Another shaft 350 is geared to the shaft 330 so that it also turns in proportion to T. Splined on the shaft 350 is a sleeve 351 having on its outer surface a screw thread or worm 352. On the worm 352 is a nut 353 which is held against rotation.

A rod 360 is slidably mounted on the frame. It carries a rigid arm 361 having a groove which engages a circumferential flange 354 on the sleeve 351 and a pivoted arm 362 containing a slot 363 which is engaged by a pin 355 on the nut 353.

The sliding rod 360 is moved by the operator of the device, for example, through a crank 364 geared to a rack 365 on the rod. Means are provided for indicating the position of the rod 360. Such means is illustrated as a dial 366 geared to the rack 365.

The device contains three bars of transparent material each of which has a mark along its center line. The three bars lie substantially in a common plane tangent to the drum 311. The bar 371 is laterally movable and is attached at one end to the nut 342. This bar is parallel to the axis of the drum 311. The bar 372 is a continuation of the roller-bearing arm 322 so that it is turnable about the pivot 324 and laterally displaceable with the rod 320. The bar 373 is a continuation of the arm 362 so that it is turnable about the pivot 369 and laterally displaceable with the rod 360.

In the use of the device, the positions of the bars 371 and 372 and the angular position of the bar 373 are determined automatically by the turning of the shaft T and the sliding of the rod 320. The operator of the device adjusts the sliding rod 360, which varies the lateral position of the rod 373 without changing its angular position, until the center line of the rod 373 intersects the intersection of the center lines of the rods 371 and 372. The correction $\Delta f(t)$ necessary to predict the values that $f(t)$ will have after the lapse of a period equal to the value T at the time of the prediction may be read directly on the dial 366.

The principle of operation of the device which makes this result possible will now be explained.

In the initial or zero position of the parts of the device, the rod 320 is so positioned that the pivot 324 is on the center line NM of the drum 311. The roller 323 is also on this center line and the bar 372 extends along the center and, therefore, intersects the rod 371 on the center line. The slide 360 is positioned to place the pivot 369 which it carries directly over the rod 320 and to make the bar 373 intersect the bar 371 on the center line. The dial 366 is at zero.

When the shaft 330 is turned to the zero position for T, the bar 371 is directly over the slide rod 320 and the nut 353 is so positioned on the worm 352 that the pin 355 is on a line with the pivot 369 so that the bar 373 lies directly over the bar 371.

When the shaft 330 is turned to represent a value of T other than zero, the nut 353 is screwed along the worm 352 through a distance which is proportional to T. At the same time, the bar 371 is displaced to a distance from the rod 320 which is proportional to T. The pitch of the worm 341 is such that the distance of the bar 371 from the rod 320 is equal to T/2 on the scale which represent the rate of turning of the drum 311. That is to say, if for example the constant speed of the periphery of the drum 311 is one centimeter per second and the value of T/2 is 5 seconds, the distance from the rod 320 to the bar 371 is five centimeters.

The ratio of the pitches of the worms 341 and 352 is so related to the fixed distance c between the shaft 350 and the bar 360 that turning movements of the rod 330 move the intersection of the bars 371 and 373 along the center line MN without displacing it from the center line, so long as the zero setting of the slide rod 360 is maintained.

Now consider the effect of giving the first time derivative of the function in question $$\frac{df(t)}{dt}$$

a value other than zero. The sliding rod 320 is then displaced by an amount equal to $$\frac{df(t)}{dt}$$

so that the distance between the pivot 324 and the center line is $$\frac{df(t)}{dt}$$

tors. The angle which each rod will make to a line perpendicular to the axes of the drums 414, 415 will remain constant and will be a measure of the constant speed of the rod 416, and the angles of the two rods will be the same in spite of difference in the lengths of their two carrying arms $a_1$, $a_2$.

Now consider the effect of making $f(t)$ a more complicated function so that the rod 416 will be moved at a non-uniform speed. In this case, on every change in the speed of the rod 416, the rods 420 and 421 will start to take new positions corresponding to the new speed, but their time lags in assuming the new positions will be different owing to the difference in the lengths of their wheel-carrying arms $a_1$, $a_2$. As a result, the angle between the two rods at any moment will be substantially proportional to the second time derivative of $f(t)$. The angle between the rods is thus a measure of the acceleration of the rod 416 and the device is, therefore, useful as an acceleration meter.

It may be demonstrated that:
K tan α is almost exactly equal to $$k\frac{df(t)}{dt} + \frac{d^2f(t)}{dt^2}\cdot\frac{k^2}{2}$$

where $\alpha$ is the angle between the line 427—428 and a perpendicular to the axes of the cylinders, $k$ is the fixed time interval for which the prediction is to be made and K is a constant of the apparatus. Consequently, the dial 439 indicates directly the value of the correction required for the prediction.

In the use of the apparatus, the rod 416 is moved mechanically or manually in accordance with the function of time whose value is to be predicted, and an operator stationed at the crank 438 turns the disc 430 so as to keep the graduations of the disc parallel to a line through the center of the marks 425, 426. While this is being done, the correction which must be added to the present value $f(t)$, the function of time in question, in order to predict the value which the function will have after the lapse of $k$ seconds, may be read directly from the dial 439.

It is evident that many changes may be made in the specific form of the apparatus illustrated without changing the principle of the apparatus which is to determine acceleration by the difference between two speed indicators having different time lags.

(5) Fire director apparatus

Fig. 18 shows schematically a complete apparatus for observing a moving target, such as an airplane, and determining the ballistic elements required in order to hit it. This apparatus combines the devices whose separate operation has already been described.

To facilitate a description of the fire director apparatus, I shall refer to the rectangular coordinates of a projection of the target at the time of observation as $x_1$, $y_1$ and to its polar coordinates as $g_1$ (present training angle or azimuth), $d_1$ (present ground range). $d_1$ is, of course, equal to $h \cot s_1$ (Fig. 11). I shall refer to the coordinates of the target at the point of impact as $x_2$, $y_2$ and $g_2$, $d_2$. $g_2$ may be termed the predicted azimuth and $d_2$ the predicted ground range. I shall refer to the time of travel of the shell as T.

The telescope 100 has the training and elevating mechanism shown in Fig. 15 so that, after being set on the target, it follows the target automatically except for such adjustments of the hand wheels 143, 148 as may be required by changes in the constants of the target's movement.

The training and elevating shafts 110, 111 of the telescope, whose rotations are proportional respectively to $g_1$ and log cot $s_1$, are connected by shafts 500, 501, 502 to the transformer 200 shown in Fig. 13, in the manner described in connection with Fig. 13. A turning movement proportional to log $h$ obtained by turning the crank 156 in accordance with indications of the logarithmic dial 164, as in Figs. 12 and 15, is added to the rotation of the elevating shaft in a differential 233 shown in Fig. 13, so that shafts 500, 502 entering the transformer 200 turn proportionally to $g_1$ and log $d_1$, functions of the polar coordinates of the position of a projection of the target at the time of observation. Shaft 500 may be termed the present-azimuth shaft and shaft 502 the present-ground-range shaft. The output slides 217', 218' of the transformer 200 (connected to the same elements of the transformer as the bars 217, 218 shown in Fig. 13) are moved proportionately to $$\frac{dx_1}{dt} \text{ and } \frac{dy_1}{dt}$$

the first time derivatives of the rectangular coordinates of the position of the target at the time of observation.

The output slides 217', 218' of the transformer 200 are directly connected to the input slides $320_x$, $320_y$ of two predictors $300_x$, $300_y$, each of which is like the predictor shown in Fig. 16. The input shafts $330_x$ and $330_y$ of the predictors are driven from a shaft 503 which is turned proportionately to T, the time of travel of the shell, by means hereafter described. The values of $\Delta x$, $\Delta y$ indicated by the slides $360_x$, $360_y$ of the predictors are, therefore, the difference between the rectangular coordinates of the airplane at the observation point and at the point of impact.

The present-azimuth shaft 500 and the present-ground-range shaft 502, which as has been said are connected to the training and elevating shafts of the telescope so that their rotations are proportional respectively to $g_1$ and log $d_1$, are connected to a predicted-azimuth shaft 504 and a predicted-ground-range shaft 505 through differentials 189, 188 which form part of a distributor-double-transformer apparatus precisely like that shown in Fig. 9 except that the double-transformer is preferably constructed in accordance with Fig. 10. The present-azimuth shaft 500 and the present-ground-range shaft 502 are directly connected to the shafts $C_3$, $B_3$ of this apparatus, while the predicted-azimuth shaft 504 and the predicted-ground-range shaft 505 are directly connected to the shafts $C_1$, $B_1$ of this apparatus. The connecting shafts are marked as in Fig. 9. The shaft $C_4$ which enters the differential 189 may be designated "the azimuth-difference shaft" and the shaft $B_4$ which enters the differential 188 may be designated "the range-difference shaft." The operation of this apparatus, as described in connection with Figs. 9 and 10, is such that the slides 192, 193 of the double-transformer indicate the differences $\Delta x$, $\Delta y$ between rectangular coordinates corresponding to the polar coordinates represented by the turning of the shafts 500, 502 and the shafts 504, 505, and the value of $\Delta x$ may be changed by turning the crank E of the distributor while the value of $\Delta y$ may be changed by turning the crank F of the distributor. The operator of the crank E watches the slide 360x of the predictor 330x and the slide 192 of the double-transformer and manipulates the crank E so as to maintain the value of $\Delta x$ indicated by the slide 192 equal to the value indicated by the slide 360x. In the same way, the operator of the crank F makes the value of $\Delta y$ indicated by the slide 193 always equal to that indicated by the slide 360y of the predictor 300y. As a result of this, the turning movements given to the azimuth-difference and range-difference shafts C4, B4 represent differences in polar coordinates corresponding to the differences in rectangular coordinates indicated by the predictors, so that the predicted-azimuth shaft 504 and predicted-ground-range shaft 505 are turned proportionately to $g_2$ and log $d_2$, functions of the polar coordinates of a projection of the impact point.

The turning of the shaft 504, being proportional to the training or bearing angle of the impact point, gives the training angle for the gun.

The gun elevation, being a function of $d_2$ and $h$, is determined by a computing device 506 (which may be of conventional construction) which is connected to the shaft 505 and to the shaft 560 turned by the crank 156.

A computing device 515 connected to the same shafts indicates by a pointer 507 the instantaneous value of T, the time of travel of the shell. The shaft 503 is manually turned by a crank 508 to keep a pointer 509 on this shaft in line with the pointer 507. This explains how the value T is obtained for introduction into the predictors 300x, 300y.

Another computing device 510 (which may be of conventional construction) is connected to the shafts 505 and 560 to compute the difference between the time of travel T and the fuse setting. The shaft 511, which is turned in proportion to the value which the shell setting would have if the shell could be set at the instant of firing, has added to it in a differential 512 a correction based on the fixed time interval between setting the fuse and firing. This correction is determined in a predictor 400 like that shown in Fig. 17. The input slide 416 of the predictor is connected to the shaft 511, while the output shaft 434 is connected to the differential 512. The predictor is proportioned so that its constant $k$ is equal to the fixed time interval between setting the fuse and firing. The output shaft 513 of the differential 512, therefore, turns in proportion to the corrected value of the fuse setting.

The fire control apparatus thus determines all the ballistic elements from observations of the target made with the telescope 100 and with an altimeter which is used to guide the operator of the crank 156 in setting the dial 164.

Fig. 19 shows diagrammatically a fire control apparatus like that shown schematically in Fig. 18. The apparatus of Fig. 19 differs from that of Fig. 18 in incorporating the training and elevating mechanism of Fig. 12 with the indicator of Fig. 13, instead of the automatic training and elevating mechanism of Fig. 15. Fig. 19 omits the predictor 300y and the parts connected with it, as they are similar to the connections of the predictor 300x which is shown.

The actual construction of the apparatus indicated in Fig. 19 involves certain mechanical simplifications over the form indicated schematically in Fig. 18:

The two discs of the double-transformer which are mounted on a fixed axis (41₂ and 42₂ in Fig. 10) are used as the discs of the transformer 200 by simply extending the rod A₃ of Fig. 10 through the sliding block 102 of Fig. 13. The output slides of the transformer 200, which are moved in proportion to $$\frac{dx_1}{dt}, \frac{dy_1}{dt}$$

one of which 217' is shown in Fig. 19, are used to move cross bars 217, 218 cooperating with the transformer 220 in the indicator of the training and elevating mechanism, in addition to being connected to the input slides of the predictors (one of which 320x is shown in Fig. 19).

Instead of juxtaposing the slide 92 of the double-transformer and the slide 360x of the predictor 300x so that their relative positions can be observed (as indicated in Fig. 18), these slides are connected together; and the operator of the crank E of the distributor, instead of observing the slides 192 and 360x, observes the three bars 370, 372, 373 of the predictor 300x and manipulates the crank so as to keep the bar 373 which is displaced by the slide 360x through the slide 92 intersecting the intersection of the other two bars. This avoids the necessity for providing the predictor with the crank 364 shown in Fig. 16, and with an operator for this crank.

The arrangement of the fire director apparatus facilitates the introduction of corrections for the parallax between the point of observation and the position of the gun, and for wind. The $x$ component of the wind correction is introduced by adjustment of the connection between the slides 217' and 320x, which are moved proportionately to $$\frac{dx_1}{dt}$$

The $x$ component of the parallax connection is introduced in the connection between the slide 92 and the slide 360x, which are moved proportionately to the difference between the $x$ components of the positions of the target at the time of observation and at the time of impact. Scales 516, 517 may be provided in the connections referred to facilitate introducing the $x$ components of the corrections. The $y$ components are similarly introduced in the connections to the predictor 300y which is not shown in Fig. 19.

It will be observed that in the fire director apparatus which has been described, the calculations are made in terms of the rectangular coordinates of the observation and impact positions of the target, while all the connections are made by shafts rotating as functions of corresponding polar coordinates. It will be noted further by comparing Figs. 4 and 5 and adverting to Equations 24 and 25 that selection of a logarithmic function of the $\rho$ coordinate for the rotation of the shafts connected with the elevating shaft of the telescope adds greatly to the simplicity and accuracy and practical character of the apparatus.

What I claim is:

1. In a fire director system of the type having a predicted-azimuth shaft driven by a differential in which are added the turning of an azimuth-difference shaft and a present-azimuth shaft connected to a sight, a predicted-ground-range shaft driven from a differential in which are added the turning of a range-difference shaft and a present-ground-range shaft controlled by an elevation shaft connected to a sight and an altitude shaft, a device for transforming polar coordinates into rectangular coordinates connected to the present-azimuth shaft and the present-ground-range shaft, a similar transformer connected to the predicted-azimuth shaft and the predicted-ground-range shaft, and means operated by the first transformer device, the altitude shaft and the predicted-ground-range shaft for calculating predicted rectangular-coordinate differences: the improvement which consists in the combination of a connection between the sight and the elevation shaft to make the turning of the elevation shaft proportional to the logarithm of the cotangent of the elevation angle which it gives to the sight, means for turning the altitude shaft in proportion to the logarithm of the altitude shown by the altimeter, a differential connecting the elevation shaft and the altitude shaft to the present-ground-range shaft so that it is turned in proportion to the logarithm of the present ground range, discs in each of the transformers having equiangular spiral tracks and connected respectively to the present-ground-range shaft and the predicted-ground-range shaft, a computing device for computing the ω coordinate of the logarithm of the ρ coordinate of a point from mutually independent functions of its two rectangular coordinates, said computing device having its outputs connected to the azimuth-difference shaft and to the range-difference shaft, and manually-operable actuators connected to the inputs of the computing device.

2. In fire director apparatus, means for determining the rectangular coordinates of a horizontal projection of the target, comprising the combination with a sight for following the target, of training and elevating shafts for the sight so connected with the sight that one of them turns in proportion to the training angle which it gives the sight and the other turns in proportion to the logarithm of the cotangent of the elevating angle which it gives the sight, an altitude shaft, means for turning the altitude shaft proportionately to the logarithm of the altitude indicated by an altimeter, a differential connected to the elevating shaft and to the altitude shaft so as to add their turning movements, a ground-range shaft driven by said differential, and a transformer device for transforming polar coordinates into rectangular coordinates connected to the training shaft and the ground-range shaft and including a rotary element having an equiangular spiral track connected to the ground-range shaft.

3. In fire director apparatus of the type having an azimuth-difference shaft connected between a present-azimuth shaft and a predicted-azimuth shaft and a range-difference shaft connected between a present-ground-range shaft and a predicted-ground-range shaft: improved means for turning the azimuth-difference shaft and the range-difference shaft in accordance with computed rectangular-coordinate differences, comprising a computing device for computing the ω coordinate and the logarithm of the ρ coordinate of a point from mutually independent functions of its two rectangular coordinates, the outputs of the computing device being connected to the azimuth-difference shaft and the range-difference shaft, manually-operable actuators connected to the inputs of the computing device, and a transformer device for transforming polar coordinates into rectangular coordinates connected to the predicted-azimuth shaft and the predicted-ground-range shaft and having a turnable element with an equiangular spiral track connected to the predicted-ground-range shaft.

4. In fire director apparatus, the combination with a sight, of training and elevating shafts for the sight so connected with the sight that one of them turns in proportion to the training angle which it gives the sight and the other turns in proportion to the logarithm of the cotangent of the elevating angle which it gives the sight, an altitude shaft, means for turning the altitude shaft proportionately to the logarithm of the altitude indicated by an altimeter, a differential connected to the elevating shaft and the altitude shaft so as to add their turning movements, a ground-range shaft driven by said differential, predicting apparatus connected to the training shaft and ground-range shaft, resolving means controlled by the training and elevating shafts, and means controlled by said resolving means for driving the training and elevating shafts at rates proportional to the rectangular coordinates of a point whose polar coordinates correspond to the turning of the training shaft in direction and to the anti-logarithm of the turning of the elevating shaft in distance.

5. In a fire director system of the type having a predicted-azimuth shaft driven by a differential in which are added the turning of an azimuth-difference shaft and a present-azimuth shaft connected to a sight, a predicted-ground-range shaft driven from a differential in which are added the turning of a range-difference shaft and a present-ground-range shaft controlled by an elevation shaft connected to a sight and an altitude shaft, a device for transforming polar coordinates into rectangular coordinates connected to the present-azimuth shaft and the present-ground-range shaft, a similar transformer connected to the predicted-azimuth shaft and the predicted-ground-range shaft, and means operated by the first transformer device, the altitude shaft and the predicted-ground-range shaft for calculating predicted rectangular-coordinate differences: the improvement which consists in the combination of a connection between the sight and the elevation shaft to make the turning of the elevation shaft proportional to the logarithm of the cotangent of the elevation angle which it gives to the sight, means for turning the altitude shaft in proportion to the logarithm of the altitude shown by an altimeter, a differential connecting the elevation shaft and the altitude shaft to the present-ground-range shaft so that the present-ground-range shaft is turned in proportion to the logarithm of the present ground range, discs in each of the transformers having equiangular spiral tracks and connected respectively to the present-ground-range shaft and the predicted-ground-range shaft, a computing device for computing the ω coordinate and the logarithm of the ρ coordinate of a point from mutually independent functions of its two rectangular coordinates, said computing device having its outputs connected to the azimuth-difference shaft and to the range-difference shaft, manually-operable actuators connected to the inputs of the computing device, and automatic means for training and elevating the sight comprising resolving means controlled by the present-azimuth shaft and the elevating shaft, means controlled by said resolving means for driving the present-azimuth shaft and the elevating shaft at rates proportional to the rectangular coordinates of a point whose polar coordinates correspond to the turning of the present-azimuth shaft in direction and to the anti-logarithm of the turning of the elevating shaft in distance.

6. A device for obtaining rotary movements proportional to functions of the polar coordinates of a moving point whose rectangular coordinates are given, comprising two output shafts, an element so connected to said shafts that its position is fixed by two polar coordinates which are functions of the turning movements of the two shafts, means for observing functions of the rectangular coordinates of said element, two actuators for the two shafts, and means interconnecting the two actuators and the two shafts including variable-speed transmissions and a return connection from at least one of the output shafts controlling said transmissions in such manner that one actuator turns the two shafts so as to vary only one of the rectangular coordinates of said element while the other actuator turns the two shafts so as to vary only the other rectangular coordinate of said element, so that, when one of said actuators is controlled to keep the observed function of one of the rectangular coordinates of said element constantly equal to a given variable and the other of said actuators is controlled so as to make the observed function of the other rectangular coordinate of said element constantly equal to another given variable, the resulting turning movements of the two output shafts are functions of polar coordinates corresponding to a pair of rectangular coordinates whose functions are equal to the given variables.

7. The combination of a transformer device for transforming functions $F$, $f$ of polar coordinates into rectangular coordinates, a computing device for computing the inverse functions $F^{-1}$, $f^{-1}$ of the polar coordinates of a point from mutually independent functions of its two rectangular coordinates, manually-operable actuators connected to the inputs of said computing device, and connections between the outputs of the computing device and the transformer device.

8. The combination of a transformer device for transforming the logarithm of the $\rho$ coordinate and the $\omega$ coordinate of a point into its rectangular coordinates, a computing device for computing the logarithm of the $\rho$ coordinate and the $\omega$ coordinate of a point from mutually independent functions of its two rectangular coordinates, manually-operable actuators connected to the inputs of said computing device, and connections between the outputs of the computing device and the transformer device.

9. The combination of a transformer device for transforming polar coordinates into rectangular coordinates including a rotary element having an equiangular spiral track, a computing device for computing the $\omega$ coordinate and the logarithm of the $\rho$ coordinate of a point from mutually independent functions of its two rectangular coordinates, manually-operable actuators connected to the inputs of the computing device, and shafts connecting the outputs of the computing device and to the transformer device, the log $\rho$ output being connected to the rotary element of the transformer device which has the equiangular spiral track.

10. A device for computing the $\omega$ coordinate and the logarithm of the $\rho$ coordinate of a point from independent functions of its rectangular coordinates, comprising an azimuth output shaft, a range output shaft, first and second input shafts, a turnable controlling element, means for multiplying the turning movement of the first input shaft by the cosine of the angular position of the controlling element, means for multiplying the turning movement of the second input shaft by the sine of the angular position of the controlling element, means for adding said products and transmitting them to the range output shaft, means for multiplying the turning movement of the second input shaft by the cosine of the angular position of the controlling element, means for multiplying the turning movement of the first input shaft by the sine of the angular position of the controlling element, means for transmitting the difference between said products to the azimuth output shaft, and a return connection between the azimuth output shaft and the controlling element.

11. A device for distributing the turning movements of two actuators between two shafts, comprising four variable-speed transmissions and two differentials, a connection between each actuator and two of the transmissions, a connection between two transmissions connected to different actuators and one differential and a connection from this differential to one of the shafts, a connection between the other two transmissions and the other differential and a connection between this differential and the other shaft, a control having a turnable element arranged to control the speed ratio of two of the transmissions in accordance with the cosine of the angular position of said turnable element and to control the speed ratio of the other two transmissions in accordance with the sine of said angular position, and a return connection from one of the shafts to the turnable element of the control.

12. Automatic training and elevating means for an instrument, comprising a training shaft connected to the instrument so that it turns in proportion to the training angle which it gives the instrument, an elevating shaft connected to the instrument so that it turns in proportion to the logarithm of the cotangent of the elevation angle which it gives to the instrument, two polar coordinate shafts, resolving means controlled by said shafts, means controlled by said resolving means for driving the training and elevating shafts at rates proportional to the two rectangular coordinates of a point whose polar coordinates correspond to the turning of the first polar coordinate shaft in direction and to the anti-logarithm of the turning of the second polar coordinate shaft in distance, a return drive connection between the training shaft and the first polar coordinate shaft, and a return drive connection between the elevating shaft and the second polar coordinate shaft.

13. Automatic training and elevating means for an instrument comprising a training shaft connected to the instrument so that it turns in proportion to the training angle which it gives the instrument, an elevating shaft connected to the instrument so that it turns in proportion to the logarithm of the cotangent of the elevation angle which it gives to the instrument, two polar coordinate shafts, resolving means controlled by said shafts, means controlled by said resolving means for driving the training and elevating shafts at rates proportional to the rectangular coordinates of a point whose polar coordinate corresponds to the turning of the first polar coordinate shaft in direction and to the anti-logarithm of the turning of the second polar coordinate shaft in distance, a return drive connection between the training shaft and the first polar coordinate shaft, a return drive connection between the elevating shaft and the second polar coordinate shaft, a setting means for adjusting the return connection between the training shaft and the first polar coordinate shaft to cause an angular displacement between said shafts, and a second setting means for adjusting the return connection between the elevating shaft and the second polar coordinate shaft to cause an angular displacement between said shafts.

14. The combination with the training and elevating means according to claim 13, of an indicator operated by the instrument to indicate coordinates of the object at which the instrument is directed, and a superimposed indicator operated by the setting means to indicate the same coordinates of the object.

15. The combination with automatic training and elevating means according to claim 13, with manual training and elevating means connected to the instrument, and connections between said two manual means and the two setting means for automatic adjustment of the angular displacement between the training and elevating shafts and the two polar coordinate shafts.

16. Automatic means for causing a sight to follow a target, comprising a training shaft connected to the sight so that it turns in proportion to the training angle which it gives the sight, an elevating shaft connected to the sight so that it turns in proportion to the logarithm of the cotangent of the elevation angle which it gives the sight, two setting shafts and two polar-coordinate shafts, means for subtracting the turning of the training shaft from the turning of the first setting shaft and transmitting the difference to the first polar-coordinate shaft, means for subtracting the turning of the elevating shaft from the turning of the second setting shaft and transmitting the difference to the second polar-coordinate shaft, a transformer having an element so connected to the polar-coordinate shafts that its angular position is proportional to the turning of the first polar-coordinate shaft and its radial position is proportional to the anti-logarithm of the turning of the second polar-coordinate shaft, means controlled by said element of the transformer for rotating the training and elevating shafts at rates respectively proportional to the two rectangular coordinates of said element, so that the sight automatically follows the target when the first setting shaft is set to the course angle of the target and the second setting shaft is set at an angle proportional to the speed of the target divided by its altitude.

17. The apparatus claimed in claim 16 in combination with means operated by the training and elevating shafts for indicating the position of a point whose rectangular coordinates are the first time derivatives of the rectangular coordinates of a horizontal projection of the target, and means connected with the setting shafts for indicating the position of a point whose polar coordinates are the course and speed to which the shafts have been set, so that, when the setting shafts are turned to bring the two points into coincidence, the sight automatically follows the target.

18. Automatic means for causing a sight to follow a target, comprising a training shaft connected to the sight so that it turns in proportion to the training angle which it gives the sight, an elevating shaft connected to the sight so that it turns in proportion to the logarithm of the cotangent of the elevation angle which it gives to the sight, a power training shaft and a hand training shaft and a differential connecting them to the training shaft, a power elevating shaft and a hand elevating shaft and a differential connecting them to the elevating shaft, two setting shafts and two polar-coordinate shafts, means for subtracting the turning of the training shaft from the turning of the first setting shaft and transmitting the difference to the first polar-coordinate shaft, means for subtracting the turning of the elevation shaft from the turning of the second setting shaft and transmitting the difference to the second polar-coordinate shaft, resolving means controlled by said polar coordinate shafts, means controlled by said resolving means for driving the power training shaft and the power elevation shaft at rates proportional to the two rectangular coordinates of a point whose polar coordinates correspond to the turning of the first polar-coordinate shaft in direction and the anti-logarithm of the turning of the second polar-coordinate shaft in distance, a connection between the hand training shaft and the polar-coordinate shafts arranged to turn the shafts so as to change one of said rectangular coordinates, and a connection between the hand elevating shaft and the polar-coordinate shafts arranged to turn them so as to change the other of said rectangular coordinates.

19. Automatic means for causing a sight to follow a target, comprising a training shaft connected to the sight so that it turns in proportion to the training angle which it gives the sight, an elevating shaft connected to the sight so that it turns in proportion to the logarithm of the cotangent of the elevation angle which it gives to the sight, a power training shaft and a hand training shaft and a differential connecting them to the training shaft, a power elevating shaft and a hand elevating shaft and a differential connecting them to the elevating shaft, two setting shafts and two polar-coordinate shafts, means for subtracting the turning of the training shaft from the turning of the first setting shaft and transmitting the difference to the first polar-coordinate shaft, means for subtracting the turning of the elevation shaft from the turning of the second setting shaft and transmitting the difference to the second polar-coordinate shaft, resolving means controlled by said polar coordinate shafts, means controlled by said resolving means for driving the power training shaft and the power elevation shaft at rates proportional to the two rectangular coordinates of a point whose polar coordinates correspond to the turning of the first polar-coordinate shaft in direction and the anti-logarithm of the turning of the second polar-coordinate shaft in distance, a distributor having two actuators and two output shafts so interconnected that one actuator turns the output shafts so as to change only one of the rectangular coordinates corresponding to polar coordinates which are functions of the turning movements of the output shafts and the other actuator turns the output shafts so as to change only the other of said rectangular coordinates, the two output shafts being connected to the setting shafts and the two actuators to the hand training and hand elevating shafts.

ANTONIN SVOBODA.